United States Patent Office 3,148,154
Patented Sept. 8, 1964

3,148,154
PREVENTION AND/OR RESOLUTION
OF EMULSIONS
Melvin De Groote, St. Louis, and Kwan-Ting Shen, Brentwood, Mo., assignors to Petrolite Corporation, a corporation of Delaware
No Drawing. Filed May 12, 1960, Ser. No. 28,514
20 Claims. (Cl. 252—344)

This application is a continuation-in-part of our co-pending application Serial No. 730,510, filed April 24, 1958, now abandoned. This invention relates to the prevention and/or resolution of emulsions employing as treating agents compounds which are (1) oxyalkylated, (2) acylated, (3) oxyalkylated then acylated, (4) acylated then oxyalkylated, and (5) acylated, then oxyalkylated and then acylated, monomeric polyaminomethyl phenols. These substituted phenols are produced by a process which is characterized by reacting a preformed methylol phenol (i.e. formed prior to the addition of the polyamine) with at least one mole of a secondary polyamine per equivalent of methylol group on the phenol, in the absence of an extraneous catalyst (in the case of an aqueous reaction mixture, the pH of the reaction mixture being determined solely by the methylol phenol and the secondary polyamine), until about one mole of water per equivalent of methylol group is removed; and then reacting this product with (1) an oxyalkylating agent, (2) an acylating agent, (3) an oxyalkylating agent then an acylating agent, (4) an acylating agent then an oxyalkylating agent or (5) an acylating agent then an oxyalkylating agent and then an acylating agent.

The reasons for the unexpected monomeric form and properties of the polyaminomethyl phenol are not understood. However, we have discovered that when (1) a preformed methylolphenol (i.e. formed prior to the addition of the polyamine) employed as a starting material is reacted with (2) a polyamine which contains at least one secondary amino group (3) in amounts of at least one mole of secondary polyamine per equivalent of methylol group on the phenol, (4) in the absence of an extraneous catalyst, until (5) about one mole of water per equivalent of methylol group is removed, then a monomeric polyaminomethyl phenol is produced which is capable of being oxyalkylated, acylated, oxyalkylated then acylated, or acylated then oxyalkylated, or acylated, then oxyalkylated and then acylated to provide the superior products employed in the process of this invention. All of the above five conditions are critical for the production of these monomeric polyaminomethyl phenols.

In contrast, if the methylol phenol is not preformed but is formed in the presence of the polyamine, or the preformed methylol phenol is condensed with the polyamine in the presence of an extraneous catalyst, either acidic or basic, for example, basic or alkaline materials such as NaOH, Ca(OH)$_2$, Na$_2$CO$_3$, sodium methylate, etc., a polymeric product is formed. Thus, if an alkali metal phenate is employed in place of the free phenol, or even if a lesser quantity of alkali metal is present than is required to form the phenate, a polymeric product is formed. Where a polyamine containing only primary amino groups and no secondary amino groups is reacted with a methylol phenol, a polymeric product is also produced. Similarly, where less than one mole of secondary amine is reacted per equivalent of methylol group, a polymeric product is also formed.

In general, the monomeric polyaminomethyl phenols are prepared by condensing the methylol phenol with the secondary amine as disclosed above, said condensation being conducted at a temperature sufficiently high to eliminate water but below the pyrolytic point of the reactants and product, for example, at 80° to 200° C., but preferably at 100° to 150° C. During the course of the condensation water can be removed by any suitable means, for example, by use of an azeotroping agent, reduced pressure, combinations thereof, etc. Measuring the water given off during the reaction is a convenient method of judging completion of the reaction.

The classes of methylol phenols employed in the condensation are as follows:

*Monophenols.*—A phenol containing 1, 2 or 3 methylol groups in the ortho or para position (i.e. the 2, 4, 6 positions), the remaining positions on the ring containing hydrogen or groups which do not interfere with the polyamine-methylol group condensation, for example, alkyl, alkenyl, cycloalkyl, phenyl, halogen, and alkoxy, etc., groups, and having but one nuclear linked hydroxyl group.

*Diphenols.*—One type is a diphenol containing two hydroxybenzene radicals directly joined together through the ortho or para (i.e. 2, 4 or 6) position with a bond joining the carbon of one ring with the carbon of the other ring, each hydroxybenzene radical containing 1 to 2 methylol groups in the 2, 4 or 6 positions, the remaining positions on each ring containing hydrogen or groups which do not interfere with the polyamine-methylol group condensation, for example, alkyl, alkenyl, cycloalkyl, phenyl, halogen, alkoxy, etc., groups, and having but two nuclear linked hydroxyl groups.

A second type is a diphenol containing two hydroxybenzene radicals joined together through the ortho or para (i.e. 2, 4 or 6 position ) with a bridge joining the carbon of one ring to a carbon of the other ring, said bridge being, for example, alkylene, alkylidene, oxygen, carbonyl, sulfur, sulfoxide and sulfone, etc., each hydroxybenzene radical containing 1 to 2 methylol groups in the 2, 4 or 6 positions, the remaining positions on each ring containing hydrogen or groups which do not interfere with the polyaminomethylol group condensation, for example, alkyl, alkenyl, cycloalkyl, phenyl, halogen, alkoxy, etc., groups, and having but two nuclear linked hydroxyl groups.

The secondary polyamines employed in producing the condensate are illustrated by the following general formula:

where at least one of the R's contains an amino group and the R's contain alkyl, alkoxy, cycloalkyl, aryl, aralkyl, alkaryl, radicals and the corresponding radicals containing heterocyclic radicals, hydroxy radicals, etc. The R's may also be joined together to form heterocyclic polyamines. The preferred classes of polyamines are the alkylene polyamines, the hydroxylated alkylene polyamines, branched polyamines containing at least three primary amino groups, and polyamines containing cyclic amidine groups. The only limitation is that there shall be present in the polyamine at least one secondary amino group which is not bonded directly to a negative radical which reduces the basicity of the amine, such as a phenyl group.

An unusual feature of the products employed in the process of the present invention is the discovery that methylol phenols react more readily under the herein specified conditions with secondary amino groups than with primary amino groups. Thus, where both primary and secondary amino groups are present in the same molecule, reaction occurs more readily with the secondary amino group. However, where the polyamine contains only primary amino groups, the product formed under reaction conditions as mentioned above is an insoluble resin. In contrast, where the same number of primary amino groups are present on the amine in addition to at least one secondary amino group, reaction occurs predominantly with the secondary amino group to form non-resinous derivatives. Thus, where trimethylol phenol is reacted with ethylene diamine, an insoluble resinous composition is produced. However, where diethylene triamine, a compound having just as many primary amino groups as ethylene diamine, is reacted, according to this invention a non-resinous product is unexpectedly formed.

The term "monomeric" as employed in the specification and claims refers to a polyaminomethylphenol containing within the molecular unit one aromatic unit corresponding to the aromatic unit derived from the starting methylol phenol and one polyamine unit for each methylol group originally in the phenol. This is in contrast to a polymeric or resinous polyaminomethyl phenol containing within the molecular unit more than one aromatic unit and/or more than one polyamino unit for each methylol group.

The monomeric products produced by the condensation of the methylol phenol and the secondary amine may be illustrated by the following "idealized" formula:

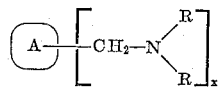

where A is the aromatic unit corresponding to that of the methylol reactant, and the remainder of the molecule is the polyaminomethyl radical, one for each of the original methylol groups.

This condensation reaction may be followed by oxyalkylation in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportions thereof in relation to the methylol phenolamine condensation product. Thus, the molar ratio of alkylene oxide to amine condensate can range within wide limits, for example, from a 1:1 mole ratio to a ratio of 1000:1, or higher, but preferably 1 to 200. For example, in demulsification extremely high alkylene oxide ratios are advantageously employed such as 200–300 or more pounds of alkylene oxide per pound of amine condensate. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

As in the amine condensation, acylation is conducted at a temperature sufficiently high to eliminate water and below the pyrolytic point of the reactants and the reaction products. In general, the reaction is carried out at a temperature of from 140° to 280° C., but preferably at 140° to 200° C. In acylating, one should control the reaction so that the phenolic hydroxyls are not acylated. Because acyl halides and anhydrides are capable of reacting with phenolic hydroxyls, this type of acylation should be avoided. It should be realized that either oxyalkylation or acylation can be employed alone or each alternately, either one preceding the other. In addition, the amine condensate can be acylated, then oxyalkylated and then reacylated. The amount of acylation agent reacted will depend on reactive groups or the compounds and properties desired in the final product, for example, the molar ratios of acylation agent to amine condensate can range from 1 to 15, or higher, but preferably 1 to 4.

Where the above amine condensates are treated with alkylene oxides, the product formed will depend on many factors, for example, whether the amine employed is hydroxylated, etc. Where the amines employed are non-hydroxylated, the amine condensate is at least susceptible to oxyalkylation through the phenolic hydroxyl radical. Although the polyamine is non-hydroxylated, it may have one or more primary or secondary amino groups which may be oxyalkylated, for example, in the case of tetraethylene pentamine. Such groups may or may not be susceptible to oxyalkylation for reasons which are obscure. Where the non-hydroxylated amine contains a plurality of secondary amino groups, wherein one or more is susceptible to oxyalkylation, or primary amino groups, oxyalkylation may occur in those positions. Thus, in the case of the non-hydroxylated polyamines oxyalkylation may take place not only at the phenolic hydroxyl group but also at one or more of the available amino groups. Where the amine condensate is hydroxyalkylated, this latter group furnishes an additional position of oxyalkylation susceptibility.

The product formed in acylation will vary with the particular polyaminomethyl phenol employed. It may be an ester or an amide depending on the available reactive groups. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid employed, the first mole of water being evolved during amidification. The product formed in such cases is believed to contain a cyclic amidine ring such as an imidazoline or a tetrahydropyrimidine ring.

Ordinarily the methods employed for the production of amino imidazolines result in the formation of substantial amounts of other products such as amido imidazolines. However, certain procedures are well known by which the yield of amino imidazolines is comparatively high as, for example, by the use of a polyamine in which one of the terminal hydrogen atoms has been replaced by a low molal alkyl group or an hydroxyalkyl group, and by the use of salts in which the polyamine has been converted into a monosalt such as combination with hydrochloric acid or paratoluene sulfonic acid. Other procedures involve reaction with a hydroxyalkyl ethylene diamine and further treatment of such imidazoline having a hydroxyalkyl substituent with two or more moles of ethylene imine. Other well known procedures may be employed to give comparatively high yields.

Other very useful derivatives comprise acid salts and quaternary salts, derived therefrom. Since the compositions contain basic nitrogen groups, they are capable of reacting with inorganic acids, for example hydrohalogens (HCl, HBr, HI), sulfuric acid, phosphoric acid, etc., aliphatic acids (acetic, propionic, glycolic, diglycolic, etc.), aromatic acids (benzoic, salicylic, phthalic, etc.), and organic compounds capable of forming salts, for example, those having the general formula RX wherein R is an organic group, such as an alkyl group (e.g. methyl, ethyl, propyl, butyl, octyl, nonyl, decyl, undecyl, dodecyl, tridecyl, pentadecyl, oleyl, octadecyl, etc.), cycloalkyl (e.g. cyclopentyl, cyclohexyl, etc.), aralkyl (e.g. benzyl, etc.), and the like, and X is a radical capable of forming a salt such as those derived from acids (e.g. halide, sulfate, phosphate, sulfonates, etc., radicals). The preparation of these salts and quaternary compounds is well known to the chemical art. For example, they may be prepared by adding suitable acids (for example, any of those mentioned herein as acylating agents) to solutions of the basic composition or by heating such compounds as alkyl halides with these compositions. Diacid and quaternary salts can also be formed by reacting alkylene dihalides, polyacids, etc. The number of moles of acid and quaternary compounds that may react with the composition of this invention will, of course, depend on the number of basic nitrogen groups in the molecule. These salts may be represented by the general formula N+ X−, wherein N comprises the part of the compound containing the nitrogen group which has been rendered positively charged by the H or R of the alkylating compound and X represents the anion derived from the alkylating compound.

THE METHYLOL PHENOL

As previously stated, the methylol phenols include monophenols and diphenols. The methylol groups on the phenol are either in one or two ortho positions or in the para position of the phenolic rings. The remaining phenolic ring positions are either unsubstituted or substituted with groups not interfering with the amine methylol condensation. Thus, the monophenols have 1, 2 or 3 methylol groups and the diphenols contain 1, 2, 3 or 4 methylol groups.

The following is the monophenol most advantageously employed:

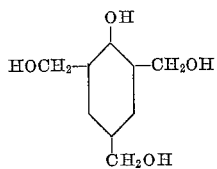

This compound, 2,4,6 trimethylol phenol (TMP) is available commercially in 70% aqueous solutions. The designation TMP is sometimes used to designate trimethylol propane. Apparently no confusion is involved, in light of the obvious differences.

A second monophenol which can be advantageously employed is:

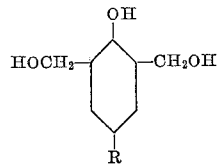

where R is an aliphatic saturated or unsaturated hydrocarbon having, for example, 1–30 carbon atoms, for example, methyl, ethyl, propyl, butyl, sec-butyl, tert-butyl, amyl, tert-amyl, hexyl, tert-hexyl, octyl, nonyl, decyl, dodecyl, octo-decyl, etc., the corresponding unsaturated groups, etc.

The third monophenol advantageously employed is:

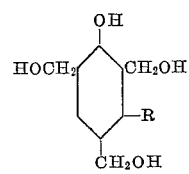

where R comprises an aliphatic saturated or unsaturated hydrocarbon as stated above in the second monophenol, for example, that derived from cardanol or hydrocardanol.

The following are diphenol species advantageously employed:
One species is

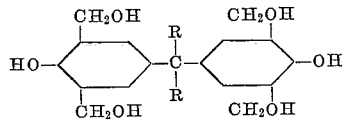

where R is hydrogen or a lower alkyl, preferably methyl.
A second species is

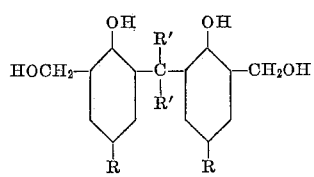

where R has the same meaning as that of the second species of the monophenols and R' is hydrogen or a lower alkyl, preferably methyl.

We can employ a wide variety of methylol phenols in the reaction, and the reaction appears to be generally applicable to the classes of phenols heretofore specified. Examples of suitable methylol phenols include:

Monophenols:

2-methylol phenol
2,6-dimethylol, 4-methyl phenol
2,4,6-trimethylol phenol
2,6-dimethylol, 4-cyclohexyl phenol
2,6-dimethylol-4-phenyl phenol
2,6-dimethylol-4-methoxyphenol
2,6-dimethylol-4-chlorophenol
2,6-dimethylol-3-methylphenol
2,6-dimethylol-4-sec-butylphenol
2,6-dimethylol, 3,5-dimethyl-4-chlorophenol
2,4,6-trimethylol, 3-pentadecyl phenol
2,4,6-trimethylol, 3-pentadecadienyl phenol.

Diphenols:

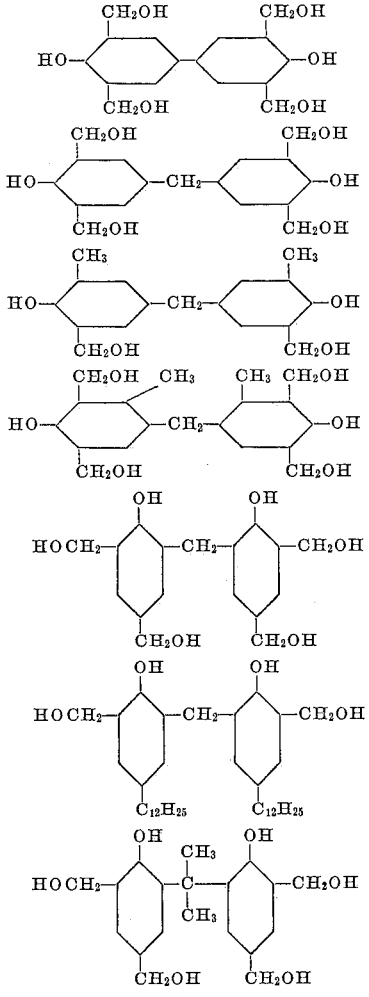

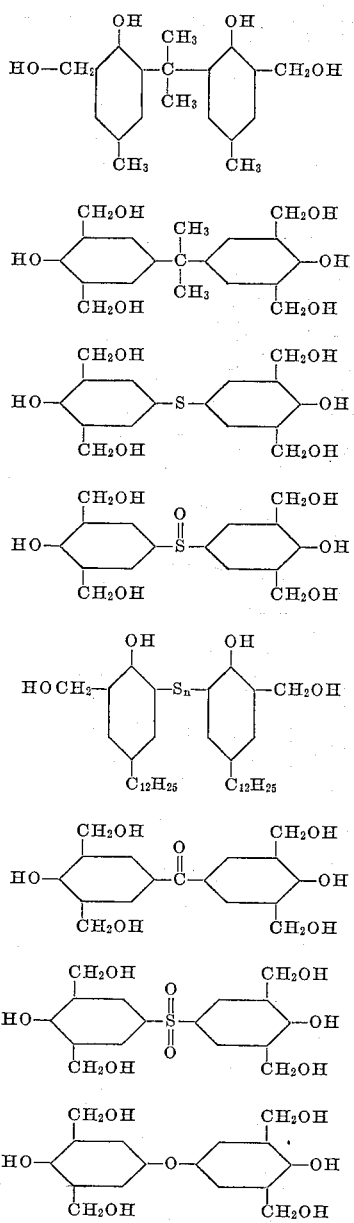

Examples of additional methylol phenols which can be employed to give the useful products of this invention are described in "The Chemistry of Phenolic Resins," by Robert W. Martin, Tables V and VI, pp. 32–39 (Wiley, 1956).

THE POLYAMINE

As noted previously, the general formula for the polyamine is $$HN\begin{matrix}R\\\\R\end{matrix}$$

This indicates that a wide variety of reactive secondary polyamines can be employed, including aliphatic polyamines, cycloaliphatic polyamines, aromatic polyamines (provided the aromatic polyamine has at least one secondary amine which has no negative group, such as a phenyl group directly bonded thereto) heterocyclic polyamines and polyamines containing mixtures of the above groups. Thus, the term "polyamine" includes compounds having one amino group on one kind of radical, for example, an aliphatic radical, and another amino group on the heterocyclic radical as in the case of the following formula:

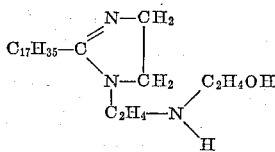

provided, of course, the polyamine has at least one secondary amino group capable of condensing with the methylol group. It also includes compounds which are totally heterocyclic, having a similarly reactive secondary amino group. It also includes polyamines having other elements besides carbon, hydrogen and nitrogen, for example, those also containing oxygen, sulfur, etc. As previously stated, the preferred embodiments of the present invention are the alkylene polyamines, the hydroxylated alkylene polyamines and the amino cyclic amidines.

Polyamines are available commercially and can be prepared by well-known methods. It is well known that olefin dichlorides, particularly those containing from 2 to 10 carbon atoms, can be reacted with ammonia or amines to give alkylene polyamines. If, instead of using ethylene dichloride, the corresponding propylene, butylene, amylene or higher molecular weight dichlorides are used, one then obtains the comparable homologues. One can also alpha-omega dialkyl ethers such as $ClCH_2OCH_2Cl$; $ClCH_2CH_2OCH_2CH_2Cl$, and the like. Such polyamines can be alkylated in the manner commonly employed for alkylating monoamines. Such alkylation results in products which are symmetrically or non-symmetrically alkylated. The symmetrically alkylated polyamines are most readily obtainable. For instance, alkylated products can be derived by reaction between alkyl chlorides, such as propyl chloride, butyl chloride, amyl chloride, cetyl chloride, and the like and a polyamine having one or more primary amino groups. Such reactions result in the formation of hydrochloric acid, and hence the resultant product is an amine hydrochloride. The conventional method for conversion into the base is to treat with dilute caustic solution. Alkylation is not limited to the introduction of an alkyl group, but as a matter of fact, the radical introduced can be characterized by a carbon atom chain interrupted at least once by an oxygen atom. In other words, alkylation is accomplished by compounds which are essentially alkyoxyalkyl chlorides, as, for example, the following:

$CH_3OC_2H_4Cl$  $C_2H_5OC_2H_4Cl$
$C_2H_5OC_3H_6Cl$  $C_6H_{13}OC_6H_{12}Cl$

The reaction involving the alkylene dichlorides is not limited to ammonia, but also involves amines, such as ethylamine, propylamine, butylamine, octylamine, decylamine, cetylamine, dodecylamine, etc. Cycloaliphatic and aromatic amines are also reactive. Similarly, the reaction also involves the comparable secondary amines, in which various alkyl radicals previously mentioned appear twice and are types in which two dissimilar radicals appear, for instance, amyl butylamine, hexyl octylamine, etc. Furthermore, compounds derived by reactions involving alkylene dichlorides and a mixture of ammonia and amines, or a mixture of two different amines are useful. However, one need not employ a polyamine having an alkyl radical. For instance, any suitable polyalkylene polyamine, such as an ethylene polyamine, a propylene polyamine, etc., treated with ethylene oxide or similar oxyalkylating agent are useful. Furthermore, various hydroxylated amines, such as monoethanolamine, monopropanolamine, and the like, are also treated with a suitable alkylene dichloride, such as ethylene dichloride, propylene dichloride, etc.

As to the introduction of a hydroxylated group, one can use any one of a number of well-known procedures such as alkylation, involving a chlorhydrin, such as ethylene chlorhydrin, glycerol chlorhydrin, or the like.

Such reactions are entirely comparable to the alkylation reaction involving alkyl chlorides previously described. Other reactions involve the use of an alkylene oxide, such as ethylene oxide, propylene oxide, butylene oxide, octylene oxide, styrene oxide or the like. Glycide is advantageously employed. The type of reaction just referred to is well known and results in the introduction of a hydroxylated or polyhydroxylated radical in an amino hydrogen position. It is also possible to introduce a hydroxylated oxyhydrocarbon atom; for instance, instead of using the chlorhydrin corresponding to ethylene glycol, one employs the chlorhydrin corresponding to diethylene glycol. Similarly, instead of using the chlorhydrin corresponding to glycerol, one employs the chlorhydrin corresponding to diglycerol.

From the above description it can be seen that many of the above polyamines can be characterized by the general formula

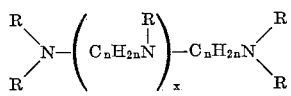

where the R's, which are the same or different, comprise hydrogen, alkyl, cycloalkyl, aryl, alkyloxyalkyl, hydroxylated alkyl, hydroxylated alkyloxyalkyl, etc., radicals, $x$ is zero or a whole number of at least one, for example 1 to 10, but preferably 1 to 3, provided the polyamine contains at least one secondary amino group, and $n$ is a whole number, 2 or greater, for example 2–10, but preferably 2–5. Of course, it should be realized that the amino or hydroxyl group may be modified by acylation to form amides, esters or mixtures thereof, prior to the methylolamino condensation provided at least one active secondary amine group remains on the molecule. Any of the suitable acylating agents herein described may be employed in this acylation. Prior acylation of the amine can advantageously be used instead of acylation subsequent to amine condensation.

A particularly useful class of polyamines is a class of branched polyamines. These branched polyamines are polyalkylene polyamines wherein the branched group is a side chain containing on the average at least one nitrogen-bonded aminoalkylene

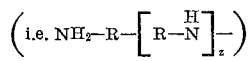

group per nine amino units present on the main chain, for example 1–4 of such branched chains per nine units on the main chain, but preferably one side chain unit per nine main chain units. Thus, these polyamines contain at least three primary amino groups and at least one tertiary amino group in addition to at least one secondary amino group.

These branched polyamines may be expressed by the formula

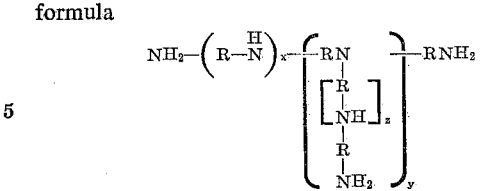

wherein R is an alkylene group such as ethylene, propylene, butylene and other homologues (both straight chained and branched), etc., but preferably ethylene; and $x$, $y$ and $z$ are integers, $x$ being for example, from 4 to 24 or more but preferably 6 to 18, $y$ being for example 1 to 6 or more but preferably 1 to 3, and $z$ being for example 0–6 but preferably 0–1. The $x$ and $y$ units may be sequential, alternative, orderly or randomly distributed.

The preferred class of branched polyamines includes those of the formula

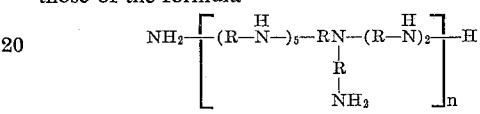

where $n$ is an integer, for example 1–20 or more but preferably 1–3, wherein R is preferably ethylene, but may be propylene, butylene, etc. (straight chained or branched).

The particularly preferred branched polyamines are presented by the following formula:

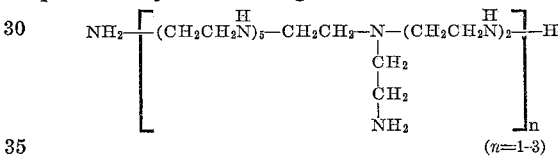

$(n=1-3)$

The radicals in the brackets may be joined in a head-to-head or a head-to-tail fashion. Compounds described by this formula wherein $n=1-3$ are manufactured and sold by Dow Chemical Company as Polyamines N–400, N–800, N–1200, etc. Polyamine N–400 has the above formula wherein $n=1$ and was the branched polyamine employed in all of the specific examples.

The branched polyamines can be prepared by a wide variety of methods. One method comprises the reaction of ethanolamine and ammonia under pressure over a fixed bed of a metal hydrogenation catalyst. By controlling the conditions of this reaction one can obtain various amounts of piperazine and polyamines as well as the branched chain polyalkylene polyamine. This process is described in Australian Patent No. 42,189 and in the East German Patent 14,480 (March 17, 1958) reported in Chem. Abstracts, August 10, 1958, 14129.

The branched polyamines can also be prepared by the following reactions:

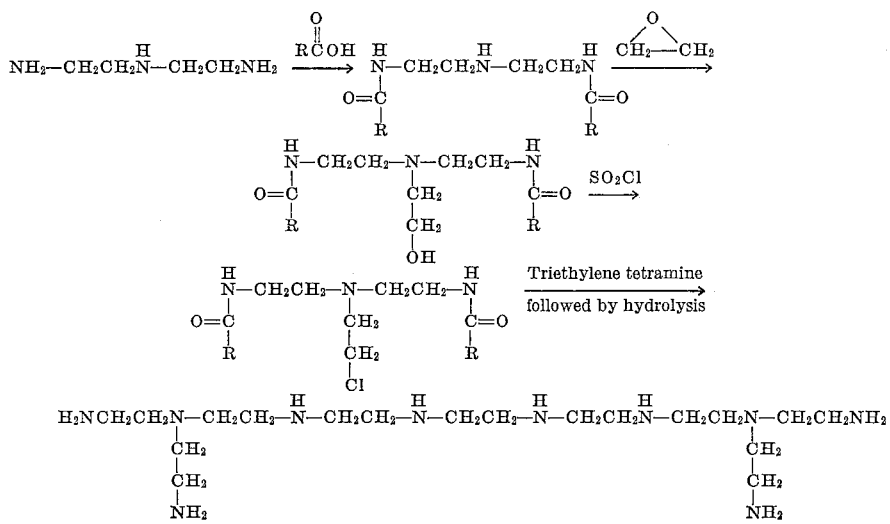

Variations on the above procedure can produce other branched polyamines.

The branched nature of the polyamine imparts unusual properties to the polyamine and its derivatives. Cyclic aliphatic polyamines having at least one secondary amino group such as piperazine, etc., can also be employed.

It should be understood that diamines containing a secondary amino group may be employed. Thus, where $x$ in the linear polyalkylene amine is equal to zero, at least one of the R's would have to be hydrogen, for example, a compound of the following formula:

$$\underset{H}{\underset{|}{N}}-CH_2-CH_2-NH_2$$
$$\overset{C_{18}H_{37}}{|}$$

Suitable polyamines also include polyamines wherein the alkylene group or groups are interrupted by an oxygen radical, for example, $$\overset{R}{\underset{R}{\diagdown}}N-\left(C_nH_{2n}OC_nH_{2n}\overset{R'}{\underset{|}{N}}\right)_x-C_nH_{2n}OC_nH_{2n}N\overset{R}{\underset{R}{\diagup}}$$

or mixtures of these groups and alkylene groups, for example, $$\overset{R}{\underset{R}{\diagdown}}N-\left(C_nH_{2n}OC_nH_{2n}\overset{R'}{\underset{|}{N}}\right)_x-C_nH_{2n}N\overset{R}{\underset{R}{\diagup}}$$

where R, $n$ and $x$ has the meaning previously stated for the linear polyamine.

For convenience the aliphatic polyamines have been classified as nonhydroxylated and hydroxylated alkylene polyamino amines. The following are representative members of the nonhydroxylated series:

Diethylene triamine,
Dipropylene triamine,
Dibutylene triamine, etc.
Triethylene tetramine,
Tripropylene tetramine,
Tributylene tetramine, etc.
Tetraethylene pentamine,
Tetrapropylene pentamine,
Tetrabutylene pentamine, etc.,
Mixtures of the above,
Mixed ethylene, propylene, and/or butylene, etc., polyamines and other members of the series.

The above polyamines modified with higher molecular weight aliphatic groups, for example, those having from 8–30 or more carbon atoms, a typical example of which is $$NH_2-C_2H_4\overset{H}{\underset{}{N}}-C_2H_4-\overset{H}{\underset{}{N}}-C_2H_4\overset{H}{\underset{}{N}}-C_{16}H_{33}$$

where the aliphatic group is derived from any suitable source, for example, from compounds of animal or vegetable origin, such as coconut oil, tallow, tall oil, soya, etc., are very useful. In addition, the polyamine can contain other alkylene groups, fewer amino groups, additional higher aliphatic groups, etc., provided the polyamine has at least one reactive secondary amino group. Compositions of this type are described in U.S. Patent 2,267,205.

Other useful aliphatic polyamines are those containing substituted groups on the chain, for example, aromatic groups, heterocyclic groups, etc., such as a compound of the formula $$R-\underset{H}{\underset{|}{N}}-(ZNH)_xH$$

where R is alkyl and Z is an alkylene group containing phenyl groups on some of the alkylene radicals since the phenyl group is not attached directly to the secondary amino group.

In addition, the alkylene group substituted with a hydroxy group $$NH_2-CH_2CH-CH_2-\underset{}{\overset{H}{N}}-CH_2-CH-CH_2NH_2$$
$$\qquad\quad\ \ |\qquad\qquad\qquad\ \ |$$
$$\qquad\quad\ OH\qquad\qquad\qquad\ OH$$

is reactive.

Polyamines containing aromatic groups in the main part of the chain are useful, for example, N,N'-dimethyl-p-xylylenediamine.

Examples of polyamines containing solely secondary amino groups include the following:

$$\overset{CH_3}{\underset{H}{\diagdown}}NC_2H_4NC_2H_4\overset{CH_3}{\underset{H}{\diagup}}$$
$$\qquad\qquad\ \ H$$

$$\overset{C_2H_5}{\underset{H}{\diagdown}}NC_2H_5NC_2H_4\overset{C_2H_5}{\underset{H}{\diagup}}$$
$$\qquad\qquad\ \ H$$

$$\overset{CH_3}{\underset{H}{\diagdown}}NC_2H_4OC_2H_4\overset{CH_3}{\underset{H}{\diagup}}$$
$$\qquad\qquad\ \ H$$

$$\overset{C_2H_5}{\underset{H}{\diagdown}}HC_2H_4OC_2H_4\overset{C_2H_5}{\underset{H}{\diagup}}$$
$$\qquad\qquad\ \ H$$

$$\overset{CH_3}{\underset{H}{\diagdown}}NC_3H_6NC_3H_6\overset{CH_3}{\underset{H}{\diagup}}$$
$$\qquad\qquad\ \ H$$

$$\overset{CH_3}{\underset{H}{\diagdown}}NC_2H_4NC_2H_4NC_2H_4\overset{CH_3}{\underset{H}{\diagup}}$$
$$\qquad\qquad\ \ H\quad\ \ H$$

$$\overset{CH_3}{\underset{H}{\diagdown}}NC_2H_4NC_2H_4NC_2H_4NC_2H_4\overset{CH_3}{\underset{H}{\diagup}}$$
$$\qquad\qquad\ \ H\quad\ \ H\quad\ \ H$$

$$(CH_3)_2NC_2H_4\underset{H}{N}C_2H_4\underset{H}{N}C_2H_4\underset{H}{N}C_2H_4N(CH_3)_2$$

Examples of polyamines having hydroxylated groups include the following:

$$\overset{CH_3}{\underset{HOC_2H_4}{\diagdown}}NC_2H_4NC_2H_4\overset{CH_3}{\underset{C_2H_4OH}{\diagup}}$$
$$\qquad\qquad\ \ H$$

$$(HOC_2H_4)_2NC_2H_4\underset{H}{N}C_2H_4N(C_2H_4OH)_2$$

$$\overset{C_2H_5}{\underset{HOC_2H_4}{\diagdown}}NC_2H_4NC_2H_4\overset{C_2H_5}{\underset{C_2H_4OH}{\diagup}}$$
$$\qquad\qquad\ \ H$$

$$\overset{CH_3}{\underset{HOC_2H_4}{\diagdown}}NC_3H_6NC_3H_6\overset{CH_3}{\underset{C_2H_4OH}{\diagup}}$$
$$\qquad\qquad\ \ H$$

$$\overset{CH_3}{\underset{HOC_2H_4}{\diagdown}}NC_2H_4NC_2H_4NC_2H_4\overset{CH_3}{\underset{C_2H_4OH}{\diagup}}$$
$$\qquad\qquad\ \ H\quad\ \ H$$

$$\overset{CH_3}{\underset{HOC_2H_4}{\diagdown}}NC_2H_4NC_2H_4NC_2H_4NC_2H_4\overset{CH_3}{\underset{C_2H_4OH}{\diagup}}$$
$$\qquad\qquad\ \ H\quad\ \ H\quad\ \ H$$

$$\overset{HOC_2H_4}{\underset{CH_3}{\diagdown}}NC_2H_4NC_2H_4NC_2H_4NC_2H_4\overset{C_2H_4OH}{\underset{CH_3}{\diagup}}$$
$$\qquad\qquad\ \ H\quad\ \ H\quad\ \ H$$

Suitable cyclic amidines include $$R-C\overset{N-CH_2}{\underset{N-CH_2}{\diagdown}}$$
$$\qquad\ \ |$$
$$\qquad\ \ H$$

$$R-C\overset{N-CH_2}{\underset{N-CH_2}{\diagdown}}$$
$$\qquad\ \ |$$
$$\qquad\ \ C_2H_4-NH-C_2H_4-NH_2$$

$$R-C\overset{N-CH-CH_3}{\underset{N-CH_2}{\diagdown}}CH_2$$
$$\qquad\ \ |$$
$$\qquad\ \ C_2H_4-NH-C_2H_4-NH_2$$

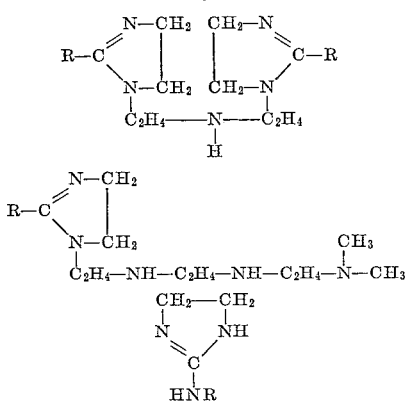

wherein R is a hydrocarbon group,

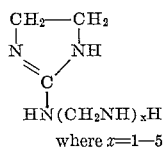

where $x=1-5$ 2-undecylimidazoline
2-heptadecylimidazoline
2-oleylimidazoline
1-N-decylaminoethyl, 2-ethylimidazoline
2-methyl, 1-hexadecylaminoethylaminoethylimidazoline
1-dodecylaminopropylimidazoline
1-(stearoyloxyethyl)aminoethylimidazoline
1-stearamidoethylaminoethylimidazoline
2-heptadecyl, 4,5-dimethylimidazoline
1-dodecylaminohexylimidazoline
1-stearoyloxyethylaminohexylimidazoline
2-heptadecyl, 1-methylaminoethyl tetrahydropyrimidine
4-methyl, 2-dodecyl, 1-methylaminoethylaminoethyl tetrahydropyrimidine

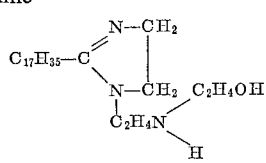

As previously stated, there must be reacted at least one mole of polyamine per equivalent of methylol group. The upper limit to the amount of amine present will be determined by convenience and economics, for example, 1 or more moles of polyamine per equivalent of methylol group can be employed.

The following examples are illustrative of the preparation of the polyaminomethylol phenol condensate and are not intended for purposes of limitation.

The following general procedure is employed in preparing the polyamine-methylol condensate. The methylolphenol is generally mixed or slowly added to the polyamine in ratios of 1 mole of polyamine per equivalent of methylol group on the phenol. However, where the polyamine is added to the methylolphenol, addition is carried out below 60° C. until at least one mole of polyamine per methylol group has been added. Enough of a suitable azeotroping agent is then added to remove water (benzene, toluene, or xylene) and heat applied. After removal of the calculated amount of water from the reaction mixture (one mole of water per equivalent of methylol group) heating is stopped and the azeotroping agent is evaporated off under vacuum. Although the reaction takes place at room temperature, higher temperatures are required to complete the reaction. Thus, the temperature during the reaction generally varies from 80–160° C. and the time from 4–24 hours. In general, the reaction can be effected in the lower time range employing higher temperatures. However, the time test of completion of reaction is the amount of water removed.

Example 1a

This example illustrates the reaction of a methylolmonophenol and a polyamine. A liter flask is employed with a conventional stirring device, thermometer phase separating trap condenser, heating mantle, etc. 70% aqueous 2,4,6 trimethylol phenol which can be prepared by conventional procedures or purchased in the open market, in this instance, the latter, is employed. The amount used is one gram mole, i.e. 182 grams, of anhydrous trimethylol phenol in 82 grams of water. This represents three equivalents of methylol groups. This solution is added dropwise with stirring to three gram moles (309 grams) of diethylene triamine dissolved in 100 ml. of xylene over about 30 minutes. An exothermic reaction takes place at this point but the temperature is maintained below approximately 60° C. The temperature is then raised so that distillation takes place with the removal of the predetermined amount of water, i.e., the water of solution as well as water of reaction. The water of reaction represents 3 gram moles or 54 grams.

The entire procedure including the initial addition of the trimethylol phenol until the end of the reaction is approximately 6 hours. At the end of the reaction period the xylene is removed, using a vacuum of approximately 80 mm. The resulting product is a viscous water-soluble liquid of a dark red color.

Example 28a

This example illustrates the reaction of a methylolmonophenol and a branched polyamine. A one liter flask is employed equipped with a conventional stirring device, thermometer, phase separating trap, condenser, heating mantle, etc. Polyamine N-400, 200 grams (0.50 mole), is placed in the flask and mixed with 150 grams of xylene. To this stirred mixture is added dropwise over a period of 15 minutes 44.0 grams (0.17 mole) of a 70% aqueous solution of 2,4,6-trimethylol phenol. There is no apparent temperature change. The reaction mixture is then heated to 140° C., refluxed 45 minutes, and 24 milliliters of water is collected (the calculated amount of water is 22 milliliters). The product is a dark brown liquid (as a 68% xylene solution).

Example 2d

This example illustrates the reaction of a methylol diphenol.

One mole of substantially water-free

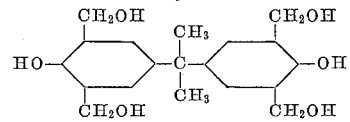

and 4 moles of triethylenetetramine in 300 ml. of xylene are mixed with stirring. Although an exothermic reaction takes place during the mixing, the temperature is maintained below 60° C. The reaction mixture is then heated and azeotroped until the calculated amount (72 g.) of water is removed (4 moles of water of reaction). The maximum temperature is 150° C. and the total reaction time is 8 hours. Xylene is then removed under vacuum. The product is a viscous water-soluble liquid.

Example 5b

In this example, 1 mole of substantially water-free

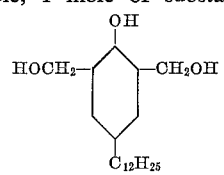

is reacted with 2 moles of Duomeen S (Armour Co.),

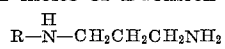

where R is a fatty group derived from soya oil, in the manner of Example 2a. Xylene is used as both solvent and azeotroping agent. The reaction time is 8 hours and the maximum temperature 150–160° C.

Example 28b

This experiment is carried out in the same equipment as is employed in Example 28a except that a 300 milliliter flask is used. Into the flask is placed 50 grams of xylene and 8.4 grams (0.05 mole) of 2,6-dimethylol-4-methylphenol are added. The resulting slurry is stirred and warmed up to 80° C. Polyamine N–400, 40.0 grams (0.10 mole) is added slowly over a period of 45 minutes. Solution takes place upon the addition of the polyamine. The reaction mixture is refluxed for about 4 hours at 140° C. and 1.8 milliliters of water is collected, the calculated amount. The product, as a xylene solution, is a brown liquid.

Example 29b

This experiment is carried out in the same equipment and in the same manner as is employed in Example 28b. To a slurry of 10.5 grams (0.05 mole) of 2,6-dimethylol-4-tertiarybutylphenol in 50 grams of xylene, 40 grams (0.10 mole) of Polyamine N–400 are added all at once with stirring and the mixture is heated and refluxed at 140° C. for 4 hours with the collection of 1.6 milliliters of water. The calculated amount of water is 1.8 milliliters. The product, as a xylene solution, is reddish brown.

Example 30b

This experiment is carried out in the same equipment and in the same manner as is employed in Example 28b. To a slurry of 14.0 grams of 2,6-dimethylol-4-nonylphenol in 50 milliliters of benzene, 40.0 grams (0.10 mole) of Polyamine N–400 are added all at once with stirring and the mixture is heated and refluxed at 140° C. for 6 hours with the collection of 1.8 milliliters of water. The calculated amount of water is 1.8 milliliters. The product, as a xylene solution, is dark brown.

The following amino-methylol condensates shown in Tables I–IV are prepared in the manner of Examples 1a, 2d, and 5b. In each case one mole of polyamine per equivalent of methylol group on the phenol is reacted and the reaction carried out until, taking into consideration the water originally present, about one mole of water is removed for each equivalent of methylol group present on the phenol.

The pH of the reaction mixture is determined solely by the reactants (i.e., no inorganic base, such as $Ca(OH)_2$, NaOH, etc. or other extraneous catalyst is present). Examples 1a, 2d, and 5b are also shown in the tables. Attempts are made in the examples to employ commercially available materials where possible.

In the following tables the examples will be numbered by a method which will describe the nature of the product. The polyamine-methylol condensate will have a basic number, for example, 1a, 4b, 6c, 4d, wherein those in the A series are derived from TMP, the B series from DMP, the C series from trimethylol cardanol and side chain hydrogenated cardanol (i.e., hydrocardanol), and the d series from the tetramethylol diphenols. The basic number always refers to the same amino condensate. The symbol A before the basic number indicates that the polyamine had been acylated prior to condensation. The symbol A after the basic number indicates that acylation takes place after condensation.

A25a means that the 25a (amino condensate) was prepared from an amine which had been acylated prior to condensation. However, 10aA means that the condensate was acylated after condensation. The symbol O indicates oxyalkylation. Thus 10aAO indicates that the amine condensate 10a has been acylated (10aA), followed by oxyalkylation. 10aAOA means that the same condensate, 10a, has been acylated (10aA), then oxyalkylated (10aAO) and then acylated. In other words, these symbols indicate both kind and order of treatment.

TABLE I

Reaction of

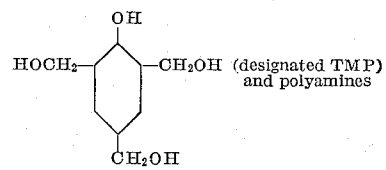

(designated TMP) and polyamines

[Molar ratio TMP to amine 1:3]

| Example | Polyamine |
|---|---|
| 1a | Diethylene triamine. |
| 2a | Triethylene tetramine. |
| 3a | Tetraethylene pentamine. |
| 4a | Dipropylene triamine. |
| 5a | Duomeen S (Armour Co.) R—NH—$CH_2CH_2CH_2NH_2$ <br> R derived from soya oil |
| 6a | Duomeen T (Armour Co.) R—NH—$CH_2CH_2CH_2NH_2$ <br> R derived from tallow |
| 7a | Oxyethylated Duomeen S <br> R—NH—$CH_2CH_2CH_2$N($C_2H_4OH$)(H) |
| 8a | Oxyethylated Duomeen T <br> R—NH—$CH_2CH_2CH_2$N($C_2H_4OH$)(H) |
| 9a | Amine ODT (Monsanto) $C_{12}H_{25}$—NH—$C_2H_4$N—$C_2H_4NH_2$ |
| 10a | Oxyethylated Amine ODT <br> $C_{12}H_{25}$—NH—$C_2H_4$N—$C_2H_4$N($C_2H_4OH$)(H) |
| 11a | N-(2-hydroxyethyl)-2-methyl-1,2-propanediamine. |
| 12a | N-methyl ethylene diamine. |
| 13a | N,N'-dimethyl ethylene diamine. |
| 14a | Hydroxyethyl ethylene diamine. |
| 15a | N,N'-dihydroxyethylethylene diamine. |
| 16a | N-methyl propylene diamine. |
| 17a | N,N'-dihydroxyethyl propylene diamine. |
| 18a | N,N'-dihydroxypropyl propylene diamine. |
| 19a | $HOC_2H_4$—N(H)$C_2H_4$O—$C_2H_4$O—$C_2H_4$N($C_2H_4OH$)(H) |
| 20a | $C_{17}H_{33}$C(=N—$CH_2$)(N(H)—$CH_2$) |
| 21a | $CH_3$C(=N—$CH_2$)(N—$CH_2$)—$C_2H_4$—N(H)—$C_2H_4$N(H)—$C_{16}H_{33}$ |
| 22a | $C_{17}H_{35}$—C(=N—$CH_2$)(N—$CH_2$)CH_2/CH_3—$C_2H_4$N(H) |
| 23a | $C_{17}H_{35}$—C(=N—$CH_2$)(N—$CH_2$)—$C_2H_4$N($C_2H_4OH$)(H) |

TABLE I—Continued

| Example | Polyamine |
|---|---|
| 24a | $C_4H_9C\begin{smallmatrix}N-CH_2\\ \phantom{x}\\ N-CH_2\\ |\\ H\end{smallmatrix}$ |
| A25a | Oleic acid prior acylated triethylene tetramine (1:1 molar ratio). |
| A26a | Stearic acid prior acylated tetraethylene pentamine (1:1 molar ratio). |
| A27a | Lauric acid prior acylated tetraethylene pentamine (1:1 molar ratio). |
| 28a | Polyamine N-400. |

The products formed in the above Table I are dark, viscous liquids.

TABLE II

Reaction of $$HOCH_2-\underset{R}{\underset{|}{\bigcirc}}-CH_2OH \text{ (designated DMP)}$$

with polyamines

[Molar ratio DMP/amine 1:2]

| Example | R | Polyamine |
|---|---|---|
| 1b | Dodecyl | Diethylene triamine. |
| 2b | Octadecyl | Triethylene tetramine. |
| 3b | Sec-butyl | Tetraethylene pentamine. |
| 4b | Dodecyl | Dipropylene triamine. |
| 5b | do | Duomeen S (Armour Co.) $R-\underset{H}{N}CH_2CH_2CH_2NH_2$ R derived from soya oil |
| 6b | Octadecyl | Duomeen T (Armour Co.) $R-\underset{H}{N}-CH_2CH_2CH_2NH_2$ R derived from tallow |
| 7b | Mixed sec. and tert-butyl. | Oxyethylated Duomeen S $R-\underset{H}{N}-CH_2CH_2CH_2N\begin{smallmatrix}C_2H_4OH\\ \\ H\end{smallmatrix}$ |
| 8b | Dodecyl | Oxyethylated Duomeen T $R-\underset{H}{N}-CH_2CH_2CH_2N\begin{smallmatrix}C_2H_4\\ \\ H\end{smallmatrix}$ |
| 9b | Tert-butyl | Amine ODT (Monsanto) $C_{12}H_{25}-\underset{H}{N}-C_2H_4N-C_2H_4NH_2$ |
| 10b | do | Oxyethylated amine ODT $C_{12}H_{25}-\underset{H}{N}-C_2H_4N-C_2H_4N\begin{smallmatrix}C_2H_4OH\\ \\ H\end{smallmatrix}$ |
| 11b | Octadecyl | N-(2-hydroxyethyl)-2-methyl-1,2 propanediamine. |
| 12b | Dodecyl | N-methyl ethylene diamine. |
| 13b | do | N,N'-dimethyl ethylene diamine. |
| 14b | do | Hydroxyethyl ethylene diamine. |
| 13b | do | N,N'-dimethyl ethylene diamine. |
| 14b | do | Hydroxyethyl ethylene diamine. |
| 15b | do | N,N'-dihydroxyethylethylene diamine. |
| 16b | do | N-methyl propylene diamine. |
| 17b | Octadecyl | N,N'-dihydroxyethyl propylene diamine. |
| 18b | do | N,N'-dihydroxypropyl propylene diamine. |
| 19b | Tert-butyl | $HOC_2H_4-\underset{H}{N}C_2H_4O-C_2H_4O-C_2H_4-N\begin{smallmatrix}C_2H_4OH\\ \\ H\end{smallmatrix}$ |

TABLE II—Continued

| Example | R | Polyamine |
|---|---|---|
| 20b | Tert-butyl | $C_{17}H_{33}C\begin{smallmatrix}N-CH_2\\ \phantom{x}\\ N-CH_2\\ |\\ H\end{smallmatrix}$ |
| 21b | do | $CH_3C\begin{smallmatrix}N-CH_2\\ \phantom{x}\\ N-CH_2\end{smallmatrix}$ $\underset{H}{C_2H_4-N}-\underset{H}{C_2H_4N}-C_{16}H_{33}$ |
| 22b | do | $C_{17}H_{35}-C\begin{smallmatrix}N-CH_2\\ \phantom{x}\\ N-CH_2\end{smallmatrix}\begin{smallmatrix}CH_2\\ CH_3\end{smallmatrix}$ $\underset{H}{C_2H_4N}$ |
| 23b | do | $C_{17}H_{35}-C\begin{smallmatrix}N-CH_2\\ \phantom{x}\\ N-CH_2\end{smallmatrix}\begin{smallmatrix}\\ C_2H_4OH\end{smallmatrix}$ $\underset{H}{C_2H_4N}$ |
| 24b | Dodecyl | $C_4H_9C\begin{smallmatrix}N-CH_2\\ \phantom{x}\\ N-CH_2\\ |\\ H\end{smallmatrix}$ |
| A25b | do | Oleic acid prior acylated triethylene tetramine (1:1 molar ratio). |
| A26b | do | Stearic acid prior acylated tetraethyline pentamine (1:1 molar ratio). |
| A27b | do | Lauric acid prior acylated tetraethylene pentamine (1:1 molar ratio). |
| 28b | Methyl | Polyamine N-400. |
| 29b | Tert-butyl | Do. |
| 30b | Nonyl | Do. |

The products formed in the above Table II are dark viscous liquids.

TABLE III

Reaction of $$HOCH_2-\underset{CH_2OH}{\underset{|}{\bigcirc}}-CH_2OH$$
$$\phantom{HOCH_2-}|R'$$

(Trimethylol cardanol and side chain hydrogenated cardanol) with polyamines

[Molar ratio of the trimethylol cardanol to amine 1:3]

| Example | R' Derived from— | Polyamine |
|---|---|---|
| 1c | Cardanol | Diethylene triamine. |
| 2c | do | Triethylene tetramine. |
| 3c | Hydrogenated Cardanol. | Tetraethylene pentamine. |
| 4c | do | Dipropylene triamine. |
| 5c | do | Duomeen S (Armour Co.) $R-\underset{H}{N}-CH_2CH_2CH_2NH_2$ R derived from soya oil |
| 6c | do | Duomeen T (Armour Co.) $R-\underset{H}{N}-CH_2CH_2CH_2NH_2$ R derived from tallow |
| 7c | Cardanol | Oxyethylated Duomeen S $R-\underset{H}{N}-CH_2CH_2CH_2N\begin{smallmatrix}C_2H_4OH\\ \\ H\end{smallmatrix}$ |

TABLE III—Continued

| Example | R' Derived from— | Polyamine |
|---|---|---|
| 8c | Hydrogenated Cardanol. | Oxyethylated Duomeen T<br>R—N(H)—CH$_2$CH$_2$CH$_2$N(C$_2$H$_4$OH)(H) |
| 9c | Cardanol | Amine ODT (Monsanto)<br>C$_{12}$H$_{25}$—N(H)—C$_2$H$_4$N(H)—C$_2$H$_4$NH$_2$ |
| 10c | Hydrogenated Cardanol. | Oxyethylated Amine ODT<br>C$_{12}$H$_{25}$—N(H)—C$_2$H$_4$N(H)—C$_2$H$_4$N(C$_2$H$_4$OH)(H) |
| 11c | Cardanol | N-(2-hydroxyethyl)-2-methyl-1,2-propanediamine. |
| 12c | Hydrogenated Cardanol. | N-methyl ethylene diamine. |

The products formed in the above Table III are dark, viscous liquids.

TABLE IV

Reaction of

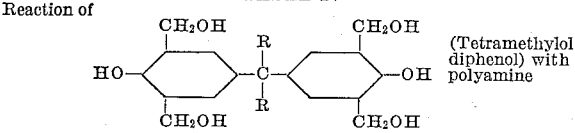

(Tetramethylol diphenol) with polyamine

[Molar ratio of tetramethylol diphenol to polyamine 1:4]

| Example | R | Polyamine |
|---|---|---|
| 1d | Hydrogen | Diethylene triamine. |
| 2d | do | Triethylene tetramine. |
| 3d | do | Tetraethylene pentamine. |
| 4d | do | Dipropylene triamine. |
| 5d | do | Duomeen S (Armour Co.)<br>R—N(H)—CH$_2$CH$_2$CH$_2$NH$_2$<br>R derived from soya oil |
| 6d | do | Duomeen T (Armour Co.)<br>R—N(H)—CH$_2$CH$_2$CH$_2$NH$_2$<br>R derived from tallow |
| 7d | do | Oxyethylated Duomeen S<br>R—N(H)—CH$_2$CH$_2$CH$_2$N(C$_2$H$_4$OH)(H) |
| 8d | do | Oxyethylated Duomeen T<br>R—N(H)—CH$_2$CH$_2$CH$_2$N(C$_2$H$_4$OH)(H) |
| 9d | do | Amine ODT (Monsanto)<br>C$_{12}$H$_{25}$—N(H)—C$_2$H$_4$N(H)—C$_2$H$_4$NH$_2$ |
| 10d | do | Oxyethylated Amine ODT<br>C$_{12}$H$_{25}$—N(H)—C$_2$H$_4$N(H)—C$_2$H$_4$N(C$_2$H$_4$OH)(H) |
| 11d | do | N-(2-hydroxyethyl)-2-methyl-1,2 propanediamine. |
| 12d | do | N-methyl ethylene diamine. |
| 13d | Methyl | Diethylene triamine. |
| 14d | do | Triethylene tetramine. |
| 15d | do | Tetraethylene pentamine. |
| 16d | do | Dipropylene triamine. |
| 17d | do | Duomeen S (Armour Co.)<br>R—N(H)—CH$_2$CH$_2$CH$_2$NH$_2$<br>R derived from soya oil |

TABLE IV—Continued

| Example | R | Polyamine |
|---|---|---|
| 18d | Methyl | Duomeen T (Armour Co.)<br>R—N(H)—CH$_2$CH$_2$CH$_2$NH$_2$<br>R derived from tallow |
| 19d | do | Oxyethylated Duomeen S<br>R—N(H)—CH$_2$CH$_2$CH$_2$N(C$_2$H$_4$OH)(H) |
| 20d | do | Oxyethylated Duomeen T<br>R—N(H)—CH$_2$CH$_2$CH$_2$N(C$_2$H$_4$OH)(H) |
| 21d | do | Amine ODT (Monsanto)<br>C$_{12}$H$_{25}$—N(H)—C$_2$H$_4$N(H)—C$_2$H$_4$HN$_2$ |
| 22d | do | Oxyethylated Amine ODT<br>C$_{12}$H$_{25}$—N(H)—C$_2$H$_4$N(H)—C$_2$H$_4$N(C$_2$H$_4$OH)(H) |
| 23d | do | N-(2-hydroxyethyl)-2-methyl-1,2-propanediamine. |
| 24d | do | N-methyl ethylene diamine. |

The products formed in the above Table IV are dark, viscous liquids.

THE ACYLATING AGENT

As in the reaction between the methylol phenol and the secondary amine, acylation is also carried out under dehydrating conditions, i.e., water is removed. Any of the well-known methods of acylation can be employed. For example, heat alone, heat and reduced pressure, heat in combination with an azeotroping agent, etc., are all satisfactory.

A wide variety of acylating agents can be employed. However, strong acylating agents such as acyl halides, or acid anhydrides should be avoided since they are capable of esterifying phenolic hydroxy groups, a feature which is undesirable.

Although a wide variety of carboxylic acids produce excellent products, in our experience monocarboxy acids having more than 6 carbon atoms and less than 40 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, angelic, tiglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetracosenoic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecanoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydnocarbic and chaulmoogric acids, cyclopentane carboxylic acids, cyclohexanecarboxylic acid, campholic acid, fencholic acids, and the like.

Examples of aromatic monocarboxylic acids are benzoic acid, substituted benzoic acids, for example, the toluic acids, the xylenic acids, alkoxy benzoic acid, phenyl benzoic acid, naphthalene carboxylic acid, and the like.

Mixed higher fatty acids derived from animal or vegetable sources, for example, lard, coconut oil, rape-seed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher moleular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesacenic, citraconic, glutaconic, itaconic, muconic, aconitic acids, and the like.

Examples of aromatic polycarboxylic acids are phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the polyaminomethyl compound will depend on the number of acetylation reactive positions contained therein as well as the number of moles one wishes to incorporate into the molecule. We have advantageously reacted 1 to 15 moles of acylating agent per mole of polyaminophenol, but preferably 3 to 6 moles.

The following examples are illustrative of the preparation of the acylated polyaminomethyl phenol condensate.

The following general procedure is employed in acylating. The condensate is mixed with the desired ratio of acid and a suitable azeotroping agent is added. Heat is then applied. After the removal of the calculated amount of water (1 to 2 equivalents per mole of acid employed), heating is stopped and the azeotroping agent is evaporated under vacuum. The temperature during the reaction can vary from 80°–200° C. (except where the formation of the cyclic amidine type structure is desired and the maximum temperature is generally 200–280°). The times range from 4 to 24 hours. Here again, the true test of the degree of reaction is the amount of water removed.

*Example 3aA*

In a 5 liter, 3 necked flask furnished with a stirring device, thermometer, phase separating trap, condenser and heating mantle, 697 grams of 3a (one mole of the TMP-tetraethylene pentamine reaction product) is dissolved in 600 ml. of xylene. 846 grams of oleic acid (3 moles) is added to the TMP-polyamine condensate with stirring in ten minutes. The reaction mixture was then heated gradually to about 145° in half an hour and then held at about 160° over a period of 3 hours until 54 grams (3 moles) of water is collected in the side of the tube. The solvent is then removed with gentle heating under a reduced pressure of approximately 20 mm. The product is a dark brown viscous liquid with a nitrogen content of 14.5%.

*Example 3aA'*

The prior example is repeated except that the final reaction temperature is maintained at 240° C. and 90 grams (5 moles) of water is removed instead of 54 grams. Infrared analysis of the product indicates the presence of a cyclic amidine ring.

*Example 7aA*

The reaction product of Example 7a (TMP and oxyethylated Duomeen S) is reacted with palmitic acid in the manner of Example 3aA. A xylene soluble product is formed.

The following examples of acylated polyaminomethyl phenol condensates are prepared in the manner of the above examples. The products obtained are dark viscous liquids.

*Example 28aA*

Into a 300 milliliter flask, fitted with a stirring device, thermometer, phase separating trap, condenser and heating mantle, is placed a xylene solution of the product of Example 28a containing 98.0 grams (0.05 mole) of the reaction product of 2,4,6-trimethylolphenol and Polyamine N-400 and about 24 grams of xylene. To this solution is added with stirring 30.0 grams (0.15 mole) of lauric acid. The reaction mixture is heated for about one hour at a maximum reaction temperature of 190° C. and 6 milliliters of water are collected. The calculated amount of water for imidazoline formation is 5.4 milliliters. The resulting product as an 88 percent xylene solution is a dark brown thick liquid.

*Example 28bA*

Into a 300 milliliter flask, fitted with a stirring device, thermometer, phase separating trap, condenser and heating mantle is placed a xylene solution of the product of Example 28b containing 35.0 grams (0.025 mole) of the reaction product of 2,6-dimethylol-4-methylphenol and Polyamine N-400 and about 20 grams of xylene. To this solution is added with stirring 14.1 grams (0.05 mole) of oleic acid. The reaction mixture is heated at reflux for 4.5 hours at a maximum temperature of 183° C. and 1.0 milliliters of water is collected, the calculated amount of water for amide formation being 0.9 milliliter. The product is a dark burgundy liquid (as 70.5% xylene solution was brown.

*Example 29bA*

This experiment is performed in the same equipment and in the same manner as employed in Example 28bA. Into the flask is placed a xylene solution of the product of Example 29b containing 40.9 grams (0.025 mole) of the reaction product of 2,6-dimethylol-4-tertiarybutyl phenol and Polyamine N-400 and about 47 grams of xylene. To this solution is added with stirring 7.2 grams (0.05 mole) of octanoic acid. The reaction mixture is heated at reflux for 3.75 hours at a maximum temperature of 154° C. and 1.3 milliliters of water is collected. The calculated amount of water for amide formation is 0.9 milliliter. The product as a 49.82 percent xylene solution).

*Example 30bA*

This experiment is performed in the same manner and in the same equipment as is employed in Example 28bA. Into the flask is placed a xylene solution of the product of Example 30b containing 39.6 grams (0.025 mole) of the reaction product of 2,6 dimethylol-4-nonylphenol and Polyamine N-400 and about 32 grams of xylene. To this solution is added with stirring 14.2 grams (0.05 mole) of stearic acid. The reaction mixture is heated at reflux for 4 hours at a maximum temperature of 160° C. and 1.0 milliliter of water is collected. The calculated amount of water for amide formation is 0.9 milliliter. The product as a 62.5% xylene solution is a brown liquid.

TABLE V.—ACYLATED PRODUCTS OF TABLE I

| Example | Acid | Grams of acid per gram-moles of condensate | Grams of water removed |
|---|---|---|---|
| 1aA | Oleic | 846 | 54 |
| 2aA | Nonanoic | 316 | 36 |
| 3aA | Oleic | 846 | 54 |
| 3aA' | do | 846 | 90 |
| 4aA | Stearic | 852 | 54 |
| 5aA | Lauric | 600 | 54 |
| 6aA | Myristic | 684 | 54 |
| 7aA | Palmitic | 768 | 54 |
| 8aA | Propanoic | 222 | 54 |
| 9aA | Dimeric [1] | 1,800 | 54 |
| 10aA | Oleic | 846 | 54 |
| 11aA | do | 846 | 54 |
| 12aA | Sunaptic acid [2] | 990 | 54 |
| 14aA | Oleic | 846 | 54 |
| 15aA | Palmitic | 1,536 | 108 |
| 16aA | Oleic | 846 | 54 |
| 17aA | do | 1,692 | 108 |
| 18aA | do | 1,692 | 108 |
| 19aA | do | 846 | 54 |
| 23aA | Acetic | 180 | 54 |
| 28aA | Lauric | 600 | 120 |

[1] Dilinoleic acid sold by Emery Industries.
[2] Naphthenic acid sold by Sun Oil Company, average molecular weight 220-230.

TABLE VI.—ACYLATED PRODUCTS OF TABLE II

| Example | Acid | Grams of acid used per gram-mole of condensate | Grams of water removed |
|---|---|---|---|
| 1bA | Stearic | 568 | 36 |
| 2bA | Oleic | 564 | 36 |
| 3bA | Lauric | 800 | 72 |
| 4bA | Acetic | 120 | 36 |
| 5bA | Myristic | 456 | 36 |
| 6bA | Palmitic | 512 | 36 |
| 7bA | Dimeric [1] | 1,200 | 36 |
| 8bA | Oleic | 564 | 36 |
| 9bA | do | 564 | 36 |
| 10bA | Sunaptic Acid [2] | 660 | 36 |
| 11bA | Oleic | 564 | 36 |
| 12bA | do | 564 | 36 |
| 14bA | Palmitic | 512 | 36 |
| 15bA | Acetic | 240 | 72 |
| 16bA | Oleic | 564 | 36 |
| 17bA | do | 1,128 | 72 |
| 18bA | do | 564 | 36 |
| 19bA | do | 564 | 36 |
| 23bA | Lauric | 400 | 36 |
| 28bA | Oleic | 564 | 40 |
| 29bA | Octanoic | 288 | 52 |
| 30bA | Stearic | 569 | 40 |

See footnotes 1 and 2, Table V.

TABLE VII.—ACYLATED PRODUCTS OF TABLE III

| Example | Acid | Grams of acid used per gram-mole of condensate | Grams of water removed |
|---|---|---|---|
| 1cA | Oleic | 564 | 36 |
| 2cA | Palmitic | 512 | 36 |
| 3cA | Lauric | 800 | 72 |
| 4cA | Myristic | 456 | 36 |
| 5cA | Acetic | 120 | 36 |
| 6cA | Dimeric [1] | 1,200 | 36 |
| 7cA | Oleic | 564 | 36 |
| 8cA | do | 564 | 36 |
| 9cA | Sunaptic [2] | 660 | 36 |
| 10cA | Oleic | 564 | 36 |
| 11cA | do | 564 | 36 |
| 12cA | do | 564 | 36 |

See footnotes 1 & 2, Table V.

TABLE VIII.—ACYLATED PRODUCTS OF TABLE IV

| Example | Acid | Grams of acid used per gram-mole of condensate | Grams of water removed |
|---|---|---|---|
| 1dA | Oleic | 1,128 | 72 |
| 2dA | do | 1,128 | 72 |
| 3dA | Stearic | 2,272 | 144 |
| 4dA | Lauric | 800 | 72 |
| 5dA | Myristic | 912 | 72 |
| 6dA | Palmitic | 1,024 | 72 |
| 7dA | Oleic | 1,128 | 72 |
| 8dA | Dimeric [1] | 2,400 | 72 |
| 9dA | Sunaptic [2] | 1,320 | 72 |
| 10dA | Acetic | 240 | 72 |
| 11dA | Oleic | 1,128 | 72 |
| 12dA | do | 1,128 | 72 |
| 13dA | do | 1,128 | 72 |
| 14dA | do | 1,128 | 72 |
| 15dA | Palmitic | 2,048 | 144 |
| 16dA | Myristic | 912 | 72 |
| 17dA | Oleic | 1,128 | 72 |
| 18dA | Palmitic | 1,024 | 72 |
| 19dA | Steric | 1,136 | 72 |
| 20dA | do | 1,136 | 72 |
| 21dA | Oleic | 1,128 | 72 |
| 22dA | do | 1,128 | 72 |
| 23dA | do | 1,128 | 72 |
| 24dA | do | 1,128 | 72 |

See footnotes 1 and 2, Table V.

Reference has been made and reference will be continued to be made herein to oxyalkylation procedures. Such procedures are concerned with the use of monoepoxides and principally those available commercially at low cost, such as ethylene oxide, propylene oxide and butylene oxide, octylene oxide, styrene oxide, etc.

Oxyalkylation is well known. For purpose of brevity reference is made to Parts 1 and 2 of U.S. Patent No. 2,792,371, dated May 14, 1957, to Dickson in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The following examples illustrate oxyalkylation.

*Example 1aAO₁*

The reaction vessel employed is a 4 liter stainless steel autoclave equipped with the usual devices for heating and heat control, a stirrer, inlet and outlet means, etc., which are conventional in this type of apparatus. The stirrer is operated at a speed of 250 r.p.m. Into the autoclave is charged 1230 grams (1 mole) of 1aA, and 500 grams of xylene. The autoclave is sealed, swept with nitrogen, stirring started immediately, and heat applied. The temperature is allowed to rise to approximately 100° C. at which time the addition to ethylene oxide is started. Ethylene oxide is added continuously at such speed that it is absorbed by the reaction mixture as added. During the addition 132 grams (3 moles) of ethylene oxide is added over 2¼ hours at a temperature of 100° C. to 120° C. and a maximum pressure of 30 p.s.i.

*Example 1aAO₂*

The reaction mass of Example 1AO is transferred to a larger autoclave (capacity 15 liters) similarly equipped. Without adding any more xylene the procedure is repeated so as to add another 264 grams (6 moles) of ethylene oxide under substantially the same operating conditions but requiring about 3 hours for the addition.

*Example 1aAO₃*

In a third step, another 264 grams (6 moles) of ethylene oxide is added to the product of Example 1aAO₂. The reaction slows up and requires approximately 6 hours, using the same operating temperatures and pressures.

*Example 1aAO₄*

At the end of the third step the autoclave is opened and 25 grams of sodium methylate is added, the autoclave is flushed out as before, and the fourth and final oxyalkylation is completed, using 1100 grams (25 moles) of ethylene oxide. The oxyalkylation is completed within 6½ hours, using the same temperature range and pressure as previously.

*Example 1aAO₅*

The reaction vessel employed is the same as that used in Example 1aAO. Into the autoclave is charged 1230 g. (1 mole) of 1aA and 500 grams of xylene. The autoclave is sealed, swept with nitrogen, stirring is started immediately, and heat is applied. The temperature is allowed to rise to approximately 100° C. at which time the addition of propylene oxide is started. Propylene oxide is added continuously at such speed that it is absorbed by the reaction mixture as added. During the addition 174 g. (3 moles) of propylene oxide are added over 2½ hours at a temperature of 100 to 120° C. and a maximum pressure of 30 lbs. p.s.i.

*Example 1aAO₆*

The reaction mass of Example 1aAO₅ is transferred to a larger autoclave (capacity 15 liters). The procedure is repeated so as to add another 174 g. (3 moles) of propylene oxide under substantially the same operating conditions but requiring about 3 hours for the addition.

*Example 1aAO₇*

At the end of the second step (Example 1aAO₂) the autoclave is opened, 25 g. of sodium methylate is added, and the autoclave is flushed out as before. Oxyalkylation is continued as before until another 522 g. (9 moles) of propylene oxide are added. 8 hours are required to complete the reaction.

The following examples of oxyalkylation are carried out in the manner of the examples described above. A catalyst is used in the case of oxyethylation after the initial 15 moles of ethylene oxide are added, while in the case of oxypropylation, the catalyst is used after the initial 6 moles of oxide are added. In the case of oxybutylation, oxyoctylation, oxystyrenation, etc. the catalyst is added at the beginning of the operation. In all cases the amount of catalyst is about 1½ percent of the total reactant present. The oxides are added in the order given reading from left to right. The results are presented in the following tables:

TABLE IX.—THE OXYALKYLATED PRODUCTS OF TABLE I

[Grams of oxide added per gram-mole of condensate]

| Example | EtO | PrO | BuO | Octylene oxide | Styrene oxide |
|---|---|---|---|---|---|
| 1aO | 132 | 348 | | | |
| 2aO | 132 | 870 | | | |
| 3aO | | | 288 | | |
| 4aO | | 174 | | | |
| 5aO | 660 | | | | |
| 6aO | 440 | 174 | | | |
| 7aO | | 348 | 216 | | |
| 8aO | | 698 | 432 | | |
| 9aO | 880 | | 288 | | |
| 10aO | 1,100 | 348 | | | |
| 12aO | | | | 384 | |
| 17aO | | 1,740 | | | |
| 20aO | 264 | 1,740 | | | |
| 21aO | | | | | 390 |
| 23aO | | 1,740 | 288 | | |
| 25aO | 880 | | 432 | | |
| 28aO | 396 | 698 | | | |

TABLE X.—THE OXYALKYLATED PRODUCTS OF TABLE II

[Grams of oxide added per gram-mole of condensate]

| Example | EtO | PrO | BuO | Octylene oxide | Styrene oxide |
|---|---|---|---|---|---|
| 1bO | 264 | | | | |
| 2bO | 396 | | | | |
| 3bO | 132 | 2,030 | | | |
| 4bO | 1,100 | | 216 | | |
| 5bO | 1,320 | | | | |
| 6bO | 1,540 | | 288 | | |
| 7bO | 1,760 | | | | |
| 8bO | 1,980 | | | | |
| 9bO | 396 | 870 | | | |
| 10bO | | 1,160 | 432 | | |
| 12bO | | | | | 130 |
| 16bO | | | | 128 | |
| 18bO | | | 288 | | |
| 21bO | | | | | 260 |
| 25bO | 660 | 1,450 | 288 | | |
| 28bO | | 1,450 | 288 | | |
| 29bO | 440 | 580 | | | |
| 30bO | | | | 128 | |

TABLE XI.—THE OXYALKYLATED PRODUCTS OF TABLE III

[Grams of oxide added per gram-mole of condensate]

| Example | EtO | PrO | BuO | Octylene oxide | Styrene oxide |
|---|---|---|---|---|---|
| 1cO | 396 | | | | |
| 2cO | 660 | | | | |
| 3cO | 1,100 | | | | |
| 4cO | 1,320 | | | | |
| 5cO | 2,200 | | | | |
| 6cO | | 522 | | | |
| 7cO | | | | | 230 |
| 8cO | 1,320 | 870 | 216 | | |
| 9cO | 880 | 2,030 | | | |
| 10cO | 660 | | 360 | | |
| 12cO | | | | 256 | |

TABLE XII.—THE OXYALKYLATED PRODUCTS OF TABLE IV

[Grams of oxide added per gram-mole of condensate]

| Example | EtO | PrO | BuO | Octylene oxide | Styrene oxide |
|---|---|---|---|---|---|
| 1dO | | | | 432 | |
| 2dO | | | 1,450 | | |
| 3dO | | | 2,320 | | |
| 4dO | | 660 | 2,030 | | |
| 5dO | 1,100 | | 174 | | |
| 6dO | | | 1,450 | | |
| 7dO | | | | | 420 |
| 8dO | | | | 512 | |
| 9dO | | | 720 | | |
| 10dO | | 132 | 870 | | |
| 13dO | | 132 | 1,160 | | |
| 14dO | | 264 | 2,030 | | |
| 15dO | | 264 | 2,900 | | |
| 16dO | | 132 | 1,160 | 228 | |
| 17dO | 1,100 | | 698 | 228 | |
| 18dO | 1,320 | | | 720 | |
| 19dO | | | 1,740 | 432 | |
| 20dO | | | 2,320 | | |
| 21dO | | | 2,900 | 228 | |
| 22dO | 132 | | 2,030 | | |

TABLE XIII.—THE OXYALKYLATED PRODUCTS OF TABLE V

[Grams of oxide added per gram-mole of condensate]

| Example | EtO | PrO | BuO | Octylene oxide | Styrene oxide |
|---|---|---|---|---|---|
| 1aO₁ | 132 | | | | |
| 1aO₂ | | | | | 390 |
| 1aO₃ | 660 | | | | |
| 1aO₄ | 1,760 | | | | |
| 1aO₅ | | | 174 | | |
| 1aO₆ | | | 348 | | |
| 1aO₇ | 396 | | 522 | | |
| 2aAO | 264 | | | | |
| 3aAO | | | | 384 | |
| 3aAO | | | | | 390 |
| 4aAO | 1,540 | | | | |
| 5aAO | 1,100 | | | | |
| 6aAO | 1,320 | | | | |
| 7aAO | 1,100 | | 870 | | |
| 8aAO | 1,100 | | | 216 | |
| 9aAO | | | 1,450 | | |
| 10aAO | | | 2,030 | | |
| 17aAO | | | 1,450 | | |
| 20aAO | 264 | | 2,320 | | |
| 23aAO | 264 | | | 720 | |
| 28aAO | 440 | | 580 | | |

TABLE XIV.—THE OXYALKYLATED PRODUCTS OF TABLE VI

[Grams of oxide added per gram-mole of acylated product]

| Example | EtO | PrO | BuO | Octylene oxide | Styrene oxide |
|---|---|---|---|---|---|
| 1bAO | 132 | | | | |
| 2bAO | 264 | | | | |
| 3bAO | | | | 256 | |
| 3bA'O | 1,760 | | | | |
| 4bAO | | | | | 420 |
| 5bAO | 880 | 870 | | | |
| 6bAO | 880 | | | 288 | |
| 7bAO | 660 | 2,030 | | | |
| 8bAO | 660 | | | 720 | |
| 9bAO | 880 | 2,320 | | | |
| 10bAO | 880 | 1,450 | 432 | | |
| 14bAO | 1,760 | 1,450 | 216 | | |
| 28bAO | 440 | 580 | | | |
| 29bAO | | 522 | 216 | | |
| 30bAO | 440 | | 360 | | |

TABLE XV.—THE OXYALKYLATED PRODUCTS OF TABLE VI

[Grams of oxide added per gram-mole of acylated product]

| Example | EtO | PrO | BuO | Octylene oxide | Styrene oxide |
|---|---|---|---|---|---|
| 1cAO | 132 | | | | |
| 2cAO | | | | | 390 |
| 3cAO | 880 | | | | |
| 4cAO | 1,320 | | | | |
| 5cAO | 220 | | | | |
| 6cAO | | | | 256 | |
| 7cAO | | | 216 | | |
| 8cAO | | 348 | | | |
| 9cAO | | | 432 | | |
| 10cAO | 880 | 870 | | | |
| 11cAO | 880 | 870 | 216 | | |
| 12cAO | 1,320 | | 288 | | |

TABLE XVI.—THE OXYALKYLATED PRODUCTS OF TABLE VII

[Grams of oxide added per gram-mole of acylated product]

| Example | EtO | PrO | BuO | Octylene oxide | Styrene oxide |
|---|---|---|---|---|---|
| 1dAO | 132 | | | | |
| 2dAO | | | | 512 | |
| 3dAO | | 174 | | | |
| 4dAO | | | 216 | | |
| 5dAO | | | | | 520 |
| 6dAO | | | 432 | | |
| 7dAO | 660 | | | | |
| 8dAO | 1,100 | | | | |
| 9dAO | 1,760 | | | | |
| 10dAO | 1,980 | | | | |
| 13dAO | 660 | 580 | | | |
| 14dAO | 660 | 1,450 | | | |
| 15dAO | 660 | 1,740 | 288 | | |
| 16dAO | 1,100 | 2,320 | 432 | | |
| 17dAO | | 870 | 216 | | |
| 18dAO | | 1,450 | 216 | | |
| 19dAO | | 1,740 | 432 | | |
| 20dAO | | 2,610 | | | |
| 21dAO | | 2,900 | | | |
| 22dAO | | 3,190 | | | |

Since the oxyalkylated, and the acylated and oxyalkylated prducts have terminal hydroxy groups, they can be acylated. This step is carried out in the manner previously described for acylation. These examples are illustrative and not limiting.

*Example 1aOA*

One mole (919 grams) of 1aO mixed with 846 grams (three moles) of oleic acid and 300 ml. xylene. The reaction mixture is heated to about 150–160° C. over a period of 2 hours until 54 grams (3 moles) of water are removed. Xylene is then removed under vacuum. The product 1aOA is xylene soluble.

*Example 1aAOA*

The process of the immediately previous example is repeated using 1aAO. The product 1aAOA is xylene soluble.

Additional examples are presented in the following tables. All of the products are dark, viscous liquids.

TABLE XVII.—THE ACYLATED PRODUCTS OF TABLES IX, X, XI, XII

| Example | Acid | Grams of acid per gram-mole of oxyalkylated product | Grams water removed |
|---|---|---|---|
| 1aOA | Oleic | 282 | 18 |
| 2aOA | do | 282 | 18 |
| 3aOA | do | 282 | 18 |
| 4aOA | do | 282 | 18 |
| 28aOA | Stearic | 284 | 18 |
| do | do | 284 | 18 |
| 1bOA | Myristic | 228 | 18 |
| 2bOA | Stearic | 284 | 18 |
| 3bOA | Oleic | 282 | 18 |
| 4bOA | do | 282 | 18 |
| 28bOA | Stearic | 284 | 18 |
| 29bOA | Oleic | 282 | 18 |
| 30bOA | Lauric | 200 | 18 |
| 1cOA | Oleic | 282 | 18 |
| 2cOA | do | 282 | 18 |
| 3cOA | do | 282 | 18 |
| 4cOA | Stearic | 284 | 18 |
| 1dOA | Oleic | 564 | 36 |
| 2dOA | Stearic | 568 | 36 |
| 3dOA | Oleic | 564 | 36 |
| 4dOA | do | 564 | 36 |

TABLE XVIII.—THE ACYLATED PRODUCTS OF TABLES XIII, XIV, XV, XVI

| Example | Acid | Grams of acid per gram-mole of oxyalkylated product | Grams water removed |
|---|---|---|---|
| 1aAOA | Oleic | 282 | 18 |
| 2aAOA | Stearic | 284 | 18 |
| 3aAOA | Oleic | 282 | 18 |
| 4aAOA | Stearic | 284 | 18 |
| 28aAOA | Laurie | 200 | 18 |
| 1bAOA | Oleic | 282 | 18 |
| 2bAOA | do | 282 | 18 |
| 3bAOA | Stearic | 284 | 18 |
| 4bAOA | Oleic | 282 | 18 |
| 23bAOA | Stearic | 284 | 18 |
| 29bAOA | Oleic | 564 | 36 |
| 30bAOA | do | 282 | 18 |
| 1cAOA | Myristic | 228 | 18 |
| 2cAOA | Laurie | 200 | 18 |
| 3cAOA | Oleic | 282 | 18 |
| 4cAOA | do | 282 | 18 |
| 1dAOA | Stearic | 568 | 36 |
| 3dAOA | do | 568 | 36 |
| 3dAOA | Oleic | 564 | 36 |
| 4dAOA | do | 564 | 36 |

(1) BREAKING AND PREVENTING WATER-IN-OIL EMULSIONS

This phase of our invention relates to the use of oxyalkylated and other products of the present invention in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

They also provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

These demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents. Miscellaneous solvents, such as pine oil, carbon tetrachloride, sulfur dioxide extract obtained in the refining of petroleum, etc., are often employed as diluents. Similarly, the material or materials employed as the demulsifying agent of our process are often admixed with one or more of the solvents customarily used in connection with conventional demulsifying agents. Moreover, said material or materials are often used alone or in admixture with other suitable well-known classes of demulsifying agents.

These demulsifying agents are useful in a water-soluble form, or in an oil-soluble form, or in a form exhibiting both oil and water-solubility. Sometimes they are used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example, at the suction side of said circulating pump.

In second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixture of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come ot the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like. However, with extremely difficult emulsions higher concentrations of demulsifier can be employed.

In many instances the oxyalkylated products herein specified as demulsifiers can be conveniently used without dilution. However, as previously noted, they may be diluted as desired with any suitable solvent. Selection of the solvent will vary, depending upon the solubility characteristics of the oxyalkylated product, and, of course will be dictated in part by economic consideration, i.e., cost. The products herein described are useful not only in diluted form but also admixed with other chemical demulsifiers.

In recent years pipeline standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphased sludge, and has little if any oil in the water phase.

The following examples show results obtained in the resolution of crude petroleum emulsions obtained from various sources.

*Examples*

This example illustrates the use of a product of the kind presently described for the demulsification of a Texas type oil which is unusually resistant to treatment. The particular demulsification agent employed is that of Example 1A–1. The operating conditions are as employed in conventional treatment (see U.S. Patent 2,626,929 to De Groote). On this particular lease, (Cobb lease Well #4 of the Texas Company, West Andrews, Texas) one part of demulsifier resolves approximately 10,000 parts of emulsion. The emulsion represents about 60% oil and 40% water. The oil produced is very bright, shows a minimum of residual impurities, and the draw-off water is absolutely clear by visual inspection. No heat is applied in the treating process.

Similarly effective demulsification is effected by employing the compounds shown in the following table. The emulsions are taken from the following leases:

(1) Gulf Oil Company, Goose Creek, Texas, Hurst Station Lease, Well #13, 25% water.

PETROLEUM WATER/OIL DEMULSIFIERS

| Ex. No. | I | | II |
|---|---|---|---|
| | Reactants (grams) | $H_2O$ eliminated (grams) | Weight of alkylene oxides added to I in alphabetical order (grams) |
| 1A–1 | 1a (439)+oleic acid (846) | 54 | (A)PrO(32620) (B)EtO(3690) |
| 1A–2 | 1a (439)+oleic acid (846) | 54 | (A)PrO(40000) (B)EtO(2300) |
| 1A–3 | 1a (439)+oleic acid (846) | 54 | (A)PrO(40000) (B)EtO(8710) |
| 1A–4 | 1a (439)+oleic acid (846) | 54 | (A)PrO(48620) (B)EtO(2585) |
| 1A–5 | 1a (439)+oleic acid (846) | 54 | (A)PrO(48620) (B)EtO(5560) |
| 1A–6 | 1a (439)+oleic acid (846) | 54 | (A)PrO(48620) (B)EtO(9320) |
| 1A–7 | 1a (439)+oleic acid (846) | 54 | (A)PrO(59830) (B)EtO(15390) |
| 1A–8 | 2a (568)+stearic acid (852) | 54 | (A)PrO(54640) (B)EtO(13660) |
| 1A–9 | 2a (568)+stearic acid (852) | 72 | (A)PrO(614470) (B)EtO(16390) |
| 1A–10 | 2a (568)+stearic acid (852) | 72 | (A)PrO(61470) (B)EtO(19120) |
| 1A–11 | 1b (492)+oleic acid (564) | 36 | (A)PrO(38760) (B)EtO(6120) |
| 1A–12 | 1b (492)+oleic acid (564) | 36 | (A)PrO(40800) (B)EtO(10200) |
| 1A–13 | 1b (492)+oleic acid (564) | 36 | (A)PrO(45900) (B)EtO(12240) |
| 1A–14 | 1c (645)+lauric acid (600) | 54 | (A)PrO(41680) (B)EtO(5950) |
| 1A–15 | 1c (645)+lauric acid (600) | 54 | (A)PrO(47640) (B)EtO(11910) |
| 1A–16 | 3c (907)+lauric acid (600) | 54 | (A)PrO(54520) (B)EtO(13630) |
| 1A–17 | 3c (907)+lauric acid (600) | 54 | (A)PrO(54520) (B)EtO(20440) |
| 1A–18 | 1d (660)+lauric acid (800) | 72 | (A)PrO(69400) (B)EtO(20820) |
| 1A–19 | 1d (660)+lauric acid (800) | 108 | (A)PrO(54080) (B)EtO(13520) |
| 1A–20 | 1d (660)+lauric acid (800) | 108 | (A)PrO(67600) (B)EtO(17580) |
| 1A–21 | 6a (1330) | | (A)BuO(26600) (B)EtO(19950) |
| 1A–22 | 9a (943) | | (A)BuO(28290) (B)EtO(14150) |
| 1A–23 | 1a (439) | | (A)PrO(17560) (B)EtO(4390) |
| 1A–24 | 2a (568) | | (A)BuO(17040) (B)EtO(5680) |
| 1A–25 | 4a (523) | | (A)BuO(15690) (B)EtO(2620) |
| 1A–26 | 1d (660) | | (A)BuO(13200) (B)EtO(5280) |
| 1A–27 | 4d (722) | | (A)BuO(30880) (B)EtO(7720) |
| 1A–28 | 28a (1960) | | (A)PrO(54520) (B)EtO(20440) |
| 1A–29 | 28a (1960) | | (A)BuO(26600) (B)EtO(19120) |
| 1A–30 | 28a (1960)+lauric acid (600) | 120 | (A)PrO(17560) (B)EtO(13630) |
| 1A–31 | 28a (1960)+lauric acid (600) | 120 | |
| 1A–32 | 28aO (3054)+stearic acid (284) | 18 | |
| 1A–33 | 28aAOA | | |
| 1A–34 | 28b (1400) | | (A)PrO(47640) (B)EtO(5950) |
| 1A–35 | 28b (1400)+oleic acid (564) | 40 | (A)BuO(17040) (B) EtO(5680) |
| 1A–36 | 28b (1400)+oleic acid (564) | 40 | |
| 1A–37 | 29b (1635) | | (A)BuO(780) (B)PrO(1264) (C)EtO(7720) |
| 1A–38 | 29bO (2655)+oleic acid (282) | 18 | |
| 1A–39 | 29bAOA | | |
| 1A–40 | 30b (1580) | | (A)PrO(40000) (B)EtO(15000) |
| 1A–41 | 30b (1580)+stearic acid (569) | 40 | |
| 1A–42 | 30b (1580)+stearic acid (569) | 40 | (A)EtO(1995) (B)PrO(12000) |

(2) Texas Company, Pierce Junction, Texas, Oden Lease Well #3, 45% water.

(3) Delhi-Taylor Oil Company, Berclair, Texas, Lutenbeck Lease, Well #9, 20% water.

(4) Sun Oil Company, Andrews, Texas, Means "A" Lease, 5% water.

(5) Shell Oil Company, Loop, Texas, Williamson Lease, Well #1, 35% water.

(6) General Petroleum Company, Wilmington, California, Southern Pacific Lease.

(7) Richfield Oil Company, North Coles Lease, Section A.

(8) Shell Oil Company, Brea, California, Puente Lease.

(9) Southwest Oil Company, Huntington Beach, California, TF #1, Wells 5 and 6.

(10) Morton Kolgush Company, Torence, California, Well #7, Redondo Beach, California.

The unexpectedness of this phase of the present invention is demonstrated since the above emulsions are ordinarily not susceptible to cationic and cryptocationic demulsifiers. The present compounds give better results, more rapid demulsification, clearer oil, cleaner draw-off water and more complete absence of sludge than other cationic demulsifiers tried. The demulsifiers prepared by reacting the methylol phenol with the polyamine and then oxyalkylating the condensate are particularly effective. For example, those products obtained by reacting one mole of TMP with three moles of diethylene triamine, triethylene tetramine or tetraethylene pentamine and then subjecting them to oxyalkylation involving the use of both ethylene and propylene oxides, preferably propylene oxide first, in the same weight ratio (i.e. equal weight of alkylene oxide to amine condensate) as employed in the oxyalkylation of certain polyamines described in U.S. Patents 2,792,369–373, show effectiveness in ratios of from 1:10,000 to 1:30,000 or higher ratios on oils of the kind available in the Puente Lease, the Southwest Oil Lease, the Morton Kolgush Co. Lease, etc. mentioned above.

Because of their demulsification properties the compounds are also useful in preventing the formation of emulsions during transit.

Often oil which meets specifications when shipped arrives emulsified at its destination when extraneous water becomes mixed with the oil during transit through pipe lines, storage in tanks during transportation in seagoing tankers, and the like.

For example, as is well known in a number of plaecs where petroleum is produced containing a minimum amount of foreign matter and is completely acceptable for refiner ypurposes prior to shipment, it is not acceptable after a shipment has been made, for instance, thousands of miles by tanker. The reason is that an empty tanker employs sea water for ballast prior to reloading and it is almost impossible to remove all ballast sea water before the next load starts. In some instances a full tanker may use sea water for ballast also. In other instances, due to seepage, etc., contamination takes place. The rolling or rocking effect of the sea voyager seems to give all the agitation required. It is to be noted that the emulsion, generally a water-in-oil type, so produced is characterized by the fact that the dispersed phase is sea water.

Typical examples are shipments of oil from the Near East to Japan, Australia, etc., and various quantities shipped to the west coast of the U.S.A. and, for that matter, to the east coast of the U.S.A.

The presence of water in petroleum distillate fuels often results in emulsion formation especially when such water-containing fuels are subjected to agitation or other conditions promoting emulsification. Unless such emulsion formation is retarded or emulsions that have been formed are resolved so as to permit separation of water from the fuel, the water entering the fuel system deleteriously affects the performance of the system, particularly mechanisms therein of ferrous metals with which the water-containing fuel comes into contact.

As an example, serious difficulties arise in marine operations when salt water, in amounts even as low as 0.01% by weight of a diesel fuel, enters diesel engines. The presence of water in the fuel enhances emulsification thereof and some of the emulsion normally passes through filtering media in the same manner as the fuel that has not been emulsified and, as a result, rapid engine failures often occur. Such failures are often due to corrosion of metal surfaces, as is manifested by surface pitting and formation of fatigue cracks on machined parts, to deleterious effects on fuel injectors resulting in broken or completely disintegrated check valve springs, to promotion of seizure of plungers in bushings and general corrosion of metal surfaces that are contacted by the water-containing fuel. Accordingly, the presence of water in petroleum distillate fuels, and particularly in diesel fuels, is highly undesirable and means are generally employed to separate the water, often in emulsified form, from the fuel. When the water present in the fuel oil is in emulsified form, one method for treating the emulsion to prevent water from entering the system is to break the emulsion and separate water from the fuel. As manufactured, petroleum distillates suitable for use as fuels are normally water free or contain not more than a trace of water and, hence, such distillates per se present little, if any, difficulty from emulsification unless extraneous water becomes admixed therewith.

In illustration reference is made to a current Navy Department Specification for diesel fuels which, in listing the chemical and physical requirements for conformance therewith, sets forth that the diesel fuels must not contain more than a trace, as a maximum, of water and sediment. Nevertheless, and in the handling of such fuels through pipe lines, storage thereof in tanks, and during transportation such as in seagoing tankers, extraneous water oftentimes becomes admixed with the fuel thereby providing difficulties inclusive of those aforesaid.

Oil in transit can be effectively inhibited against emulsification by adding a small amount, i.e., sufficient substantially to reduce the tendency of the fuel to emulsify, of the demulsifiers described above.

In practicing this phase of our invention, the contemplated demulsifiers may be added in desired amounts to a fuel oil that has emulsified as a result of water having become admixed therewith or may be added to a fuel oil to suppress emulsification thereof when such oils are subsequently exposed to conditions promoting emulsification by admixture of water therewith. For such purposes, the demulsifiers of the present invention may be employed per se, in mixtures thereof, or in combination with a suitable vehicle e.g., a petroleum fraction, to form a concentrated solution or dispersion for addition to the fuels to be treated. For example, when it is desired to add the demulsifying agent in the form of a concentrated solution or dispersion, it is preferably that such a solution or dispersion be prepared by employing a vehicle that is compatible with and does not deleteriously affect the performance of the petroleum distillate fuel to be treated. Hence, particularly suitable vehicles for preparing concentrated solutions or dispersions of the demulsifying agents include petroleum fractions similar to or identical to the petroleum distillate fuel to be treated in accordance with this invention.

In illustration, such concentrates may comprise a petroleum distillate or other suitable liquid hydrocarbon in admixture with a demulsifier as embodied herein and wherein the demulsifier is present in an amount of about 10 to 75% or higher but preferably 10 to 25% based on the weight of the concentrate. As specific illustrations, such concentrates may comprise a suitable hydrocarbon vehicle, e.g., diesel fuels, kerosenes, and other mineral oil fractions, in which there is dissolved or dispersed a demulsifier in amounts varying from about 10 to 75% by weight of the concentrate, and, in still more, specific illustration, a suitable concentrate comprising about 50% by weight of demulsifier in admixture with a petroleum hydrocarbon of diesel fuel grade.

In practice, the general procedure is either to add the compound of our invention at the refinery or at the loading dock using a proportional pump. The pumping device adds the product so that it is entirely mixed and thus insures that the cargo oil meets all the required specifications on arrival.

The amount of active emulsion preventive added will vary depending upon many factors, for example, the fuel oil, the amount of agitation encountered, the amount of water, etc. In most cases suitable results are obtained employing 0.005 to 2 parts of active compound per 100 parts of oil, but preferably 0.01 to 1 part per 100 parts of oil. In certain oils, the lower concentrations are satisfactory whereas with certain more readily emulsifiable oils, the higher concentrations are desirable.

In order further to describe this phase of our invention, several of the test compositions are prepared by dissolving 0.2% of the following compounds of this invention in a diesel fuel, mixing the thus prepared solution with an equal amount of either distilled water or synthetic sea water, and subjecting the resulting admixtures to stirring at the rate of 1500 revolutions per minute. Blanks are prepared by mixing the diesel fuel with distilled water or synthetic sea water in equal amounts. The test compositions containing no demulsifier form emulsions which persist for long periods of time after stirring is stopped. Test compositions containing the compounds shown in the following table either do not emulsify or the emulsions are completely resolved within a short time after stirring is stopped.

process for preventing, resolving or separating emulsions of the oil-in-water class.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, encountered in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions in synthetic rubber plants; synthetic latex-in-water emulsions, found in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal and furniture polish formulation. In cleaning the equipment used in processing such products, diluted oil-in-water emulsions are inadvertently, incidentally, or accidentally produced. The

EMULSION PREVENTATIVE FOR OIL IN TRANSIT

| Ex. No. | I | | II |
|---|---|---|---|
| | Reactants (grams) | $H_2O$ eliminated (grams) | Weight of alkylene oxides added to I in alphabetical order (grams) |
| 1B-1 | 1a (439)+oleic acid (846) | 54 | (A) PrO (32620) (B) EtO (3690) |
| 1B-2 | 1a (439)+oleic acid (846) | 54 | (A) PrO (40000) (B) EtO (2300) |
| 1B-3 | 1a (439)+oleic acid (846) | 54 | (A) PrO (40000) (B) EtO (8710) |
| 1B-4 | 1a (439)+oleic acid (846) | 54 | (A) PrO (48620) (B) EtO (2585) |
| 1B-5 | 1a (439)+oleic acid (846) | 54 | (A) PrO (48620) (B) EtO (5560) |
| 1B-6 | 1a (439)+oleic acid (846) | 54 | (A) PrO (48620) (B) EtO (9320) |
| 1B-7 | 1a (439)+oleic acid (846) | 54 | (A) PrO (59830) (B) EtO (15390) |
| 1B-8 | 2a (568)+stearic acid (852) | 54 | (A) PrO (54640) (B) EtO (13660) |
| 1B-9 | 2a (568)+stearic acid (852) | 72 | (A) PrO (61470) (B) EtO (16390) |
| 1B-10 | 2a (568)+stearic acid (852) | 72 | (A) PrO (61470) (B) EtO (19120) |
| 1B-11 | 1b (492)+oleic acid (564) | 36 | (A) PrO (38760) (B) EtO (6120) |
| 1B-12 | 1b (492)+oleic acid (564) | 36 | (A) PrO (40800) (B) EtO (10200) |
| 1B-13 | 1b (492)+oleic acid (564) | 36 | (A) PrO (45900) (B) EtO (12240) |
| 1B-14 | 1c (645)+lauric acid (600) | 54 | (A) PrO (41680) (B) EtO (5950) |
| 1B-15 | 1c (645)+lauric acid (600) | 54 | (A) PrO (47640) (B) EtO (11910) |
| 1B-16 | 3c (907)+lauric acid (600) | 54 | (A) PrO (54520) (B) EtO (13630) |
| 1B-17 | 3c (907)+lauric acid (600) | 54 | (A) PrO (54520) (B) EtO (20440) |
| 1B-18 | 1d (660)+lauric acid (800) | 72 | (A) PrO (69400) (B) EtO (20820) |
| 1B-19 | 1d (660)+lauric acid (800) | 108 | (A) PrO (54080) (B) EtO (13520) |
| 1B-20 | 1d (660)+lauric acid (800) | 108 | (A) PrO (67600) (B) EtO (17580) |
| 1B-21 | 6a (1330) | | (A) BuO (26600) (B) EtO (19950) |
| 1B-22 | 9a (943) | | (A) BuO (28290) (B) EtO (14150) |
| 1B-23 | 1a (439) | | (A) PrO (17560) (B) EtO (4390) |
| 1B-24 | 2a (568) | | (A) BuO (17040) (B) EtO (5680) |
| 1B-25 | 4a (523) | | (A) BuO (15690) (B) EtO (2620) |
| 1B-26 | 1d (660) | | (A) BuO (13200) (B) EtO (5280) |
| 1B-27 | 4d (722) | | (A) BuO (30880) (B) EtO (7720) |
| 1B-28 | 28a (1960) | | (A) PrO (54520) (B) EtO (20440) |
| 1B-29 | 28a (1960) | | (A) BuO (26600) (B) EtO (19120) |
| 1B-30 | 28a (1960)+lauric acid (600) | 120 | (A) PrO (17560) (B) EtO (13630) |
| 1B-31 | 28a (1960)+lauric acid (600) | 120 | |
| 1B-32 | 28aO (3054)+stearic acid (284) | 18 | |
| 1B-33 | 28aAOA | | |
| 1B-34 | 28b (1400) | | (A) PrO (47640) (B) EtO (5950) |
| 1B-35 | 28b (1400)+oleic acid (564) | 40 | (A) BuO (17040) (B) EtO (5680) |
| 1B-36 | 28b (1400)+oleic acid (564) | 40 | |
| 1B-37 | 29b (1635) | | (A) BuO (780) (B) PrO (1264) (C) EtO (7720) |
| 1B-38 | 29bO (2655)+oleic acid (282) | 18 | |
| 1B-39 | 29bAOA | | |
| 1B-40 | 30b (1580) | | (A) PrO (40000) (B) EtO (15000) |
| 1B-41 | 30b (1580)+stearic acid (569) | 40 | |
| 1B-42 | 30b (1580)+stearic acid (569) | 40 | (A) EtO (1995) (B) PrO (12000) |

(2) BREAKING OIL-IN-WATER EMULSIONS

This phase of our invention relates to the use of the oxyalkilated and other products of this invention in a disposal of aqueous wastes is, in general, hampered by the presence of oil-in-water emulsions.

Essential oils comprise non-saponifiable materials like terpenes, lactones, and alcohols. They also contain saponifiable esters or mixtures of saponificable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples ilustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, saponifiable oily or fatty esters, and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from water flushing of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or higher in certain cases.

This phase of the present invention is concerned with the resolution of those emulsions of the oil-in-water class which contain a minor proportion of dispersed phase, ranging, for example, from 20% or higher down to 50 parts per million or less.

Although the present process relates to emulsions containing for example as much as 20% or more dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amount of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion is known. In many instances, however, the emulsions to be resolved are either naturally-occurring or are accidentally or unintentionally produced; or in any event they do not result from a deliberate or premeditated procedure. In numerous instances, the emulsifying agent is unknown and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although higher concentrations are often encountered.

The process which constitutes this phase of the present invention consists in subjecting an emulsion of the oil-in-water class to the action of a demulsifier of the kind described, thereby causing the oil particles in the emulsion to coalesce sufficiently to rise to the surface of the non-oily layer (or settle to the bottom, if the oil density is greater) when the mixture is allowed to stand in the quiescent state after treatment with the reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

Our reagents are useful in undiluted form or diluted with any suitable solvent. Water is commonly found to be a highly satisfactory solvent, because of its ready availability and negligible cost; but in some cases, non-aqueous solvents such as an aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit appreciable water-solubility or water-dispersibility as well as oil-solubility or oil-dispersibility.

Our reagents may be employed alone, or they may in some instances be employed to advantage admixed with other and compatible oil-in-water demulsifiers.

Our process is commonly practiced simply by introducing small proportions of our reagent into an oil-in-water class emulsion, agitating to secure distribution of the reagent and incipient coalescence, and letting stand until the oil phase separates. The proportion of reagent required will vary with the character of the emulsion to be resolved. Ordinarily, proportions of reagent required are from 1/10,000 to 1/1,000,000 by volume of emulsion treated; but prefereably is 5–50 p.p.m. More reagent is sometimes required. We have found that the factors, reagent feed rate, agitation, and settling time are somewhat interrelated. For example, we have found that if sufficient agitation or proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved. A sub-aeration type flotation cell, of the kind commonly employed in ore beneficiation operations, is an extremely useful adjunct in the application of our reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with our reagents although there are some instances where heat is a useful adjunct. This is especially true where the viscosity of the continuous phase of the emulsion is appreciably higher than that of water.

In some instances, importantly improved results are obtained by adjusting the pH of the emulsion to be treated to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

Our reagents have likewise been successfully applied to other oil-in-water class emulsions, of which representative examples have been referred to above. Their use is, therefore, not limited to crude petroleum-in-water emulsions.

The manner of practicing the present invention is clear from the foregoing description. However, for completeness the following example is included:

Example

An oil-in-water class emulsion produced from an oil well in the Coalinga field located in Southern California contains about 1,500 p.p.m. of crude oil, on the average, and is stable for days in the absence of external resolution. Our process is practiced by flowing the well fluids, comprising free crude oil, oil-in-water emulsion and natural gas, through a gas separator, then to a steel tank of 5,000 barrel capacity. In this tank the oil-in-water emulsion falls to the bottom and is separated from the free oil. The oil-in-water emulsion is withdrawn from the bottom of the tank and the reagent of Example 2–1 introduced into the stream. The proportion employed is about 5 p.p.m. based on the volume of emulsion, on the average. The chemicalized emulsion flows to a second tank, mixing being achieved in the pipe. In the second tank it is allowed to stand quiescent. Clear water is withdrawn from the bottom of this tank, separated oil from the top.

The compounds in the following table are tested on oil-in-water emulsions taken from two currently producing oil fields, Coalinga, located in Southern California, and Mt. Poso, located in Southern California, according to the following procedure:

Natural crude oil-in-water emulsions are subjected to the demulsifiers set forth below. The mixture of emulsion and demulsifier is agitated for about two minutes at about 150 shakes per minute and then allowed to stand quiescent at 160° F. for about 19 hours. A clean break is noted at all of the concentrations shown under the conditions indicated. A check or control sample processed in the same way, except that no reagent is added to it, is still a brown emulsion at the end of the period. This is done to determine the feed ratio of demulsifier to be employed in field demulsification.

OIL-IN-WATER DEMULSIFIER

| Ex. No. | I Reactants (grams) | H₂O eliminated (grams) | Weight of alkylene oxide added to I (grams) | Demulsification Ratio (p.p.m.) |
|---|---|---|---|---|
| 2–1 | 1a (439)+oleic acid (846) | 54 | EtO (880) | 3–5 |
| 2–2 | 1a (439)+oleic acid (846) | 54 | EtO (1560) | 3–5 |
| 2–3 | 1a (439)+oleic acid (846) | 54 | PrO (200) | 3–5 |
| 2–4 | 2a (568)+oleic acid (846) | 54 | EtO (1110) | 3–5 |
| 2–5 | 2a (568)+oleic acid (846) | 54 | PrO (120) | 3–5 |
| 2–6 | 3a (679)+oleic acid (846) | 54 | EtO (920) | 3–5 |
| 2–7 | 3a (679)+oleic acid (846) | 54 | PrO (185) | 3–5 |
| 3–8 | 4a (523)+oleic acid (846) | 54 | EtO (970) | 3–5 |
| 2–9 | 4a (523)+stearic acid (582) | 54 | BuO (130) | 3–5 |
| 2–10 | 4a (523)+lauric acid (600) | 54 | BuO (140) | 3–5 |
| 2–11 | 1d (660)+lauric acid (800) | 72 | PrO (145) | 3–5 |
| 2–12 | 1d (660)+oleic acid (1128) | 72 | BuO (140) | 3–5 |
| 2–13 | 1d (660)+oleic acid (1128) | 72 | EtO (1540) | 3–5 |
| 2–14 | 2d (832)+oleic acid (1128) | 72 | EtO (1670) | 3–5 |
| 2–15 | 2d (832)+oleic acid (1128) | 72 | PrO (230) | 3–5 |
| 2–16 | 2d (832)+oleic acid (1128) | 72 | BuO (160) | 3–5 |
| 2–17 | 3d (1004)+lauric acid (800) | 72 | EtO (1450) | 3–5 |
| 2–18 | 3d (1004)+lauric acid (800) | 72 | PrO (200) | 3–5 |
| 2–19 | 4d (772)+oleic acid (1128) | 72 | EtO (1540) | 3–5 |
| 2–20 | 3d (772)+oleic acid (1128) | 72 | PrO (200) | 3–5 |
| 2–21 | 4d (772)+oleic acid (1128) | 72 | BuO (140) | 3–5 |
| 2–22 | 10a (1075) | | EtO (1670) | 3–5 |
| 2–23 | 2b (662) | | PrO (175) | 3–5 |
| 2–24 | 2c (774) | | BuO (180) | 3–5 |
| 2–25 | 3c (907) | | EtO (1630) | 3–5 |
| 2–26 | 4c (733) | | PrO (170) | 3–5 |
| 2–27 | 28a (1960) | | EtO (2540) | 3–5 |
| 2–28 | 28a (1960) | | (A) PrO (200) (B) EtO (1930) | 3–5 |
| 2–29 | 28a (1960)+lauric acid (600) | 120 | | 3–5 |
| 2–30 | 28a (1960)+lauric acid (600) | 120 | EtO (2850) | 3–5 |
| 2–31 | 28aO (3054)+stearic acid (284) | 18 | | 3–5 |
| 2–32 | 28aAOA | | | 3–5 |
| 2–33 | 28b (1400) | | (A) PrO (380) (B) EtO (240) | 3–5 |
| 2–34 | 28b (1400)+oleic acid (564) | 40 | EtO (960) (B) PrO (220) | 3–5 |
| 2–35 | 29b (1635) | | EtO (1560) | 3–5 |
| 2–36 | 29bAOA | | | 3–5 |
| 2–37 | 29b (1635)+oleic acid (282) | 18 | | 3–5 |
| 2–38 | 30b (1580)+stearic acid (569) | 40 | (A) PrO (150) (B) EtO (320) | 3–5 |
| 2–39 | 30b (1580) | | BuO (410) | 3–5 |
| 2–40 | 30bAOA | | | 3–5 |

(3) ACIDIZATION OF CALCAREOUS STRUCTURES

This phase of our invention relates to the use of the present compounds in preventing the formation of emulsions in the acidization of oil-bearing, calcareous strata, or the like. The conventional acidization process comprises introducing a strong mineral acid into an oil well for the purpose of causing the acid to disintegrate, dissolve, or react with the calcareous, oil-bearing structure of the well, in a manner that results in an increase in the amount of crude petroleum obtained from the oil-bearing strata. In this phase of our invention the present compounds are introduced with the strong mineral acid.

Many oil wells, after being subjected to acidization, produce emulsions, frequently of a very refractory nature, that have to be demulsified or subjected to chemical, electrical or similar treatment, in order to recover the oil or valuable constituent of the emulsion. Our compositions prevent the formation of objectionable water-in-oil type emulsions resulting from acidization of oil wells, or stated in another way, provide a means by which the oil-bearing, calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions, which often follow conventional acidization, represent a transitory, rather than a permanent, situation, but even if lasting only for a few weeks, are extremely objectionable. The new compositions of this invention are adapted for use in acidizing the calcareous, oil-bearing strata of a well, inasmuch as the acid component will react with or act upon the calcareous structure in a way to increase the amount of crude petroleum obtainable from said structure, without, however, converting said crude petroleum into an objectionable emulsion.

In practicing our process, the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing, or commingling of said emulsion-preventing agent with the well fluids or liquids, and the particular time when said mixing is effected, are immaterial, so long as said emulsion-preventing agent becomes mixed with, dissolved in, or commingled with the fluids of the well or the liquids or liquid mixture resulting from the acidization operation (the oil and the reaction product of the mineral acid on the calcareous structure), prior to emergence from the well. Equally good results may be obtained by the following procedure, to wit:

(a) Introducing the emulsion-preventing agent, preferably in aqueous solution, prior to the introduction of the mineral acid into the well;

(b) Introducing the emulsion-preventing agent, along with the mineral acid, i.e., dissolved in said acid; and (c) Introducing the emulsion-preventing agent, preferably in aqueous solution, immediately after the introduction of the mineral acid.

The composition of matter that we have devised for acidizing the calcareous, oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Baumé acid, as we have found that when such an acid is mixed with approximately 0.01% to 2.5% by weight based on the weight of the acid of the herein contemplated emulsion-preventing agent or agents, one obtains a new composition of matter that is perfectly stable and homogeneous, and which exhibits unusual properties, particularly when said new composition of matter is employed in the acidization of oil-bearing strata. However, we wish it to be understood that this phase of our invention, i.e., the new process and composition of matter herein described, is not restricted to the use of hydrochloric acid, but instead, contemplates the use of any suitable "strong mineral acid," several of which have previously been described as being usable in place of hydrochloric acid.

A number of problems have been involved in the introduction of strong mineral acid into oil-bearing strata of the kind containing calcium carbonate, magnesium carbonate, mixtures of the same, siliceous material, or material which is dolomitic in character, and commonly referred to as calcareous structures. One problem is the prevention of corrosion, or damage, to the metallic working parts of the well into which the acid, is introduced. This has been overcome in various ways, such as by the use of an inhibitor. The compositions of this invention also act as corrosion inhibitors. For the sake of brevity, reference is made to the following patents, which give a cross-sectional view of the art relating to acidization, although there are in addition certain other practical elements which are well known.

U.S. Patents Nos. 1,877,504, September 13, 1932, Grebe and Sanford; 1,891,667, December 20, 1932, Carr; 1,911,446, May 20, 1933, Grebe and Sanford; 1,990,960, February 12, 1935, Wilson; 2,011,579, August 20, 1935, Health and Fry; 2,024,718, December 17, 1935, Chamberlain; 2,038,956, April 28, 1936, Parkhurst; 2,053,285, September 8, 1936, Grebe; 2,128,160, August 23, 1938, Morgan; 2,128,161, August 23, 1938, Morgan; and 2,161,085, June 6, 1939, Phalen.

As has been previously stated, in the acidization of oil-bearing, calcareous strata, or the like, it has been found necessary, in some instances, to add certain other materials or compounds which give additional desirable effects, at least under certain conditions. For instance, hydrofluoric acid or fluorides have been added to intensify the action of the hydro-chloric acid used to treat the well. Possibly this is related to the action on siliceous matter in the calcareous structure. The reason for the addition of inhibitors has been previously indicated. Sometimes it has been found desirable to add tenacious, foam-producing agents, such as glue, gelating, or the like. In other instances, it has been found desirable to add calcium sequestering compounds, such as sodium hexametaphosphate. In other instances, reducing agents have been added to keep any dissolved iron salts in the ferrous state. Isopropyl alcohol, or the like, is sometimes added as a surface tension depressant. Thus, the addition of various other auxiliary agent, commonly referred to as addition agents, is well known.

For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions when an oil well is turned into production after the acidizing operation. Many oil wells are acidized without subsequently producing any emulsions; or the emulsions, if produced, are self-resolving, or readily susceptible to any moderate breaking action. However, certain wells, particularly those located in western Kansas and certain wells in Illinois, when acidized by conventional processes, yield particularly refractory emulsions. This is a rather surprising situation, insofar that the spent acid results in a solution having approximately 20% of calcium chloride present, and having a pH value of approximately 3.5 to 5.

One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances, this is not the case, and such emulsions have resulted in unusual problems. In its broadest aspect, then, the agents herein contemplated may be used simply as emulsion-preventers, in connection with the acidization of subterranean strata.

The most concentrated hydrochloric acid, ordinarily available, is about 36% HCl strength. The commercial acid of this strength, or somewhat weaker, is usually diluted with an equal quantity of water before it is used for acidization; i.e., the acid used in acidization may vary from 14% to 16.5% HCl, although acid varying in strength from 5% to 20% HCl has been employed. It is entirely feasible to add an agent to the acid, as produced at the point of manufacture, thus exemplifying the composition of matter feature of the present invention. For instance, if desired, 0.02% to 5% by weight of the contemplated agent may be added to the concentrated hydrochloric acid at the point of manufacture. Such acid can be diluted to a suitable point before being employed in the acidization process. Thus, even concentrated acid can be diluted, for instance, half and half, so that the reagent is present in the dilute product within the ratio suggested previously, to wit, 0.01% to 2.5% by weight. In many instances, the use of between 0.05% and 0.5% represents an acceptable average range.

In actual practice the hydrochloric acid obtained by a person or firm responsible for acidization operations may be used, in some instances, on oil-bearing strata which do not form severe or refractory emulsions and thus no advantage is obtained by adding a composition of the kind herein contemplated in comparison with ordinary acid. Then too, some calcareous, oil-bearing strata which produces severe emulsions may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acids has been indicated.

As has been previously suggested, one may also add to the acid intended for acidization various other reagents or addition products of the kind described in the aforementioned list of patents without affecting the operation of the emulsion-preventing agent that we employ and without danger of said emulsion-preventing agent interfering with the effectiveness of such other acidization addition products. Likewise, it has been indicated that one need not necessarily employ our emulsion-preventing agent in the form of an addition agent which is added to or mixed with the acid used in the acidizing step. Instead, our emulsion-preventing agent may be introduced in suitable aqueous solution, preferably in fairly concentrated solution, for instance, 1–5%, prior to the acidizing step or immediately after the acidizing step. The method of introduction is, of course, any conventional method and preferably employs the same apparatus and procedure used for introducing the acid. For convenience, however, and in the most preferred form, our process is exemplified by employing, as an integral part thereof, the composition of matter herein contemplated, to wit, hydrochloric acid, or the like, containing, in stable admixture, agents of the kind described.

The ineffectiveness of most ordinary demulsifiers for preventing the formation of water-in-oil type emulsions resulting from acidization is readily understandable. Ordinary demulsifiers either are not soluble in half-strength hydrochloric acid, or its equivalent, or they are not soluble in spent brine of the kind previously mentioned, i.e., brine containing, roughly, equivalent to 20% of calcium chloride, and having a pH of 3.5 to 5. Furthermore, if soluble at all, they are generally decomposed; and if they do not decompose under ordinary conditions, they at least decompose under the conditions which involve the necessary pressure employed in acidization. Then too, in some instances where such demulsifiers appear to meet all other requirements, they apparently precipitate out on the face of the pay sand or oil-bearing strata, and they may even reduce instead of increase the oil production, as compared with results obtained by ordinary acid. There are a number of other reasons not necessary to explain which prevent ordinary demulsifiers from being effective.

Many of the compounds of this invention are water-soluble. For that reason they can be used without difficulty in aqueous solution as an emulsion-preventing agent by injecting such aqueous solution into the oil-bearing strata period to acidization or immediately after acidization. Such injection is made by conventional means as, for example, the same apparatus or mechanical device employed for injecting acid into the well or oil-bearing strata. Furthermore, substantially all of the compounds of this invention are soluble in hydrochloric acid of a strength corresponding to approximately 15%. Substantially all of the compounds of the type indicated are soluble in concentrated hydrochloric acid. Commercial hydrochloric acid is ordinarily available in grades from approximately 18° Baumé, corresponding to approximately 28% anhydrous acid, to 22° Baumé, corresponding to approximately 35.2% anhydrous acid. Some commercial hydrochloric acid is available in a strength which approximates the C.P. grade, or slightly less than 37% anhydrous acid.

Needless to say, solutions of our compositions of matter can be prepared readily in any convenient manner. The selected compound can be dissolved in concentrated hydrochloric acid without dilution. The percentages employed have already been indicated. Such a concentrated hydrochloric acid may or may not contain some hydrofluoric acid. Likewise, if desired, the emulsion-preventing agent can be dissolved in water, and such aqueous solution added to the hydrochloric acid or the like in order to dilute the same to the desired concentration. Another procedure, of course, is to dilute the hydrochloric acid to the desired concentration and add the particular chemical compound which has been selected as the emulsion-preventing agent. The percentage of chemical compound of the kind herein described is added within the range of 0.01% to 5% by weight based on the weight of the acid.

*Examples*

The following test, which is a severe test for acidizing emulsions (referred to as the homogenizer test) is applied to the compounds of this invention.

Aqueous hydrochloric acid (15%) in the amount of 50 ml. is placed in a beaker. A compound selected from the table below is mixed into the acid in an amount of 0.3% by weight based on the weight of acid. Crude oil (50 ml.) is added and the mixture is then placed in a pneumatic homogenizer. This mixture is pressured through a homogenizing nozzle and the emulsion is caught in a graduate beaker. A second pass through the homogenizer is made. The resulting emulsion is caught in a graduate and the volume of acid settled is noted as a function of time. Normally, any acid that is not separated in 10 to 15 minutes will not separate. With the compounds shown in the following table, substantially all of the acid separated out within 15 minutes.

ACIDIZING DEMULSIFIERS

| Ex. No. | I Reactants (grams) | $H_2O$ eliminated (grams) | Weight of oxides added to I (grams) |
|---|---|---|---|
| 12-1 | 1a (439)+oleic acid (846) | 54 | EtO(352) |
| 12-2 | 1a (439)+oleic acid (846) | 54 | EtO(440) |
| 12-3 | 1a (439)+oleic acid (846) | 54 | PrO(870) |
| 12-4 | 1a (439)+oleic acid (846) | 54 | PrO(1450) |
| 12-5 | 1a (439)+oleic acid (846) | 54 | BuO(720) |
| 12-6 | 2a (568)+stearic acid (852) | 54 | PrO(1160) |
| 12-7 | 2a (568)+stearic acid (852) | 72 | PrO(1450) |
| 12-8 | 2a (568)+stearic acid (852) | 72 | Octylene oxide (768) |
| 12-9 | 3a (679)+lauric acid (600) | 54 | PrO(1160) |
| 12-10 | 3a (679)+lauric acid (600) | 72 | PrO(1740) |
| 12-11 | 1b (492)+lauric acid (400) | 36 | BuO(720) |
| 12-12 | 4c (733)+lauric acid (600) | 54 | EtO(440) |
| 12-13 | 4c (733)+lauric acid (600) | 54 | PrO(1160) |
| 12-14 | 1d (660)+oleic acid (1128) | 72 | PrO(1450) |
| 12-15 | 13d (688)+lauric acid (800) | 72 | PrO(1740) |
| 12-16 | 6a (1330)+lauric acid (600) | 54 | PrO(580) |
| 12-17 | 9a(943)+lauric acid (600) | 54 | BuO(720) |

| Ex. No. | I Reactants (grams) | $H_2O$ eliminated (grams) | II Weight of alkylene oxides added to I in alphabetical order (grams) |
|---|---|---|---|
| 12-18 | 28a (1960) | | (A)PrO(54520) (B)EtO(20440) |
| 12-19 | 28a (1960) | | (A)BuO(26600) (B)EtO(19120) |
| 12-20 | 28a (1960)+lauric acid (600) | 120 | (A)PrO(17560) (B)EtO(13630) |
| 12-21 | 28a (1960)+lauric acid (600) | 120 | |
| 12-22 | 28aO (3054)+stearic acid (284) | 18 | |
| 12-23 | 28aAOA | | |
| 12-24 | 28b (1400) | | (A)PrO(47640) (B)EtO(5950) |
| 12-25 | 28b (1400)+oleic acid (564) | 40 | (A)BuO(17040) (B)EtO(5680) |
| 12-26 | 28b (1400)+oleic acid (564) | 40 | |
| 12-27 | 29b (1635) | | (A)BuO(780) (B)PrO(1264) (C)EtO(7720) |
| 12-28 | 29bO (2655)+oleic acid (282) | 18 | |
| 12-29 | 29bAOA | | |
| 12-30 | 30b (1580) | | (A)PrO(40000) (B)EtO(15000) |
| 12-31 | 30b (1580)+stearic acid (569) | 40 | |
| 12-32 | 30b (1580)+stearic acid (569) | 40 | (A)EtO(1995) (B)PrO(12000) |

We claim:
1. A process for treating emulsifiable materials in an emulsion forming environment to resolve any preformed emulsion and to prevent formation of emulsions which includes subjecting the emulsifiable materials including any preformed emulsion to the action of a treating agent selected from the group consisting of:
(1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having out to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

2. The process of claim 1 where the polyamine is a polyalkylene polyamine.

3. The process of claim 1 where the acylation agent is a monocarboxy acid having 7 to 39 carbon atoms.

4. The process of claim 1 where the oxyalkylation agent is at least one 1,2-alkylene oxide having 2 to 4 carbon atoms.

5. The process of claim 1 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is at least one 1,2-alkylene oxide having 2 to 4 carbon atoms.

6. A process for breaking emulsions of the water-in-oil type characterized by subjecting the emulsion to the action of a demulsifier including a member selected from the group consisting of: (1) acylated, (2) oxyalkylated, (3) acylated then oxylalkylated, (4) oxyalkylated then acylated, (5) acylated, then oxyalkylated and then acylated, monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

7. The process of claim 6 where the member is an oxyalkylated monomeric polyaminomethyl phenol.

8. The process of claim 6 where the member is an acylated then oxyalkylated monomeric polyaminomethyl phenol.

9. The process of claim 8 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

10. A process for suppressing the emulsification of oils in transit characterized by adding to said oil a minor amount of a member selected from the group consisting of: (1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

11. The process of claim 10 where the member is an oxyalkylated monomeric polyaminomethyl phenol.

12. The process of claim 10 where the member is an acylated then oxyalkylated monomeric polyaminomethyl phenol.

13. The process of claim 12 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

14. A process for breaking emulsions of the oil-in-water type characterized by subjecting the emulsion to the action of a demulsifier including a member selected from the group consisting of: (1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

15. The process of claim 14 where the member is an oxykylated monomeric polyaminomethyl phenol.

16. The process of claim 14 where the member is an acylated then oxyalkylated monomeric polyaminomethyl phenol.

17. The process of claim 16 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

18. A process for preventing water-in-oil type emulsions resulting from acidization of calcareous oil-bearing strata characterized by introducing into the cognate fluids of a well a member selected from the group consisting of: (1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having one to four methylol groups in the 2,4,6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic hydroxyl groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

19. The process of claim 18 where the member is an acylated then oxyalkylated monomeric polyaminomethyl phenol.

20. The process of claim 19 where the phenol is 2,4,6-trimethylol phenol, the polyamine is diethylene triamine, the acylating agent is oleic acid, and the oxyalkylation agent is at least one 1,2-alkylene oxide having 2 to 4 carbon atoms.

References Cited in the file of this patent

UNITED STATES PATENTS

| | | |
|---|---|---|
| 2,271,499 | Rice | Jan. 27, 1942 |
| 2,282,513 | Downing et al. | May 12, 1942 |
| 2,325,533 | Montgomery et al. | July 27, 1943 |
| 2,360,323 | Herlocker et al. | Oct. 17, 1944 |
| 2,360,324 | Herlocker et al. | Oct. 17, 1944 |
| 2,457,634 | Bond et al. | Dec. 28, 1948 |
| 2,560,898 | Schulze et al. | July 17, 1951 |
| 2,570,377 | Revukas | Oct. 9, 1951 |
| 2,600,361 | Gunderson | June 10, 1952 |
| 2,673,164 | Hughes et al. | Mar. 23, 1954 |
| 2,679,486 | De Groote | May 25, 1954 |
| 2,693,425 | Hardman | Nov. 2, 1954 |
| 2,695,890 | De Groote | Nov. 30, 1954 |
| 2,700,024 | Hughes et al. | Jan. 18, 1955 |
| 2,713,582 | Smith | July 19, 1955 |
| 2,715,613 | Gibson | Aug. 16, 1955 |
| 2,718,498 | Salathiel | Sept. 20, 1955 |
| 2,748,080 | Newcombe et al. | May 29, 1956 |
| 2,756,156 | Hiller | July 24, 1956 |
| 2,759,975 | Chiddix | Aug. 21, 1956 |
| 2,764,601 | Garcean | Sept. 25, 1956 |
| 2,771,371 | Dieman | Nov. 20, 1956 |
| 2,771,449 | De Groote | Nov. 20, 1956 |
| 2,773,899 | Martin et al. | Dec. 11, 1956 |
| 2,805,991 | Tailleur | Sept. 10, 1957 |
| 2,816,870 | Lentz et al. | Dec. 17, 1957 |
| 2,836,559 | Bock et al. | May 27, 1958 |
| 2,843,464 | Gaston et al. | July 15, 1958 |
| 2,847,384 | Conklin et al. | Aug. 12, 1958 |
| 2,848,469 | Kroll et al. | Aug. 19, 1958 |
| 2,857,331 | Hollingsworth et al. | Oct. 21, 1958 |
| 2,946,759 | Gallant et al. | July 26, 1960 |